US006416825B1

(12) United States Patent
Kobayashi et al.

(10) Patent No.: US 6,416,825 B1
(45) **Date of Patent: *Jul. 9, 2002**

(54) LIQUID CRYSTAL COMPOSITION AND LIQUID CRYSTAL DISPLAY PROVIDED WITH THE LIQUID CRYSTAL COMPOSITION

(75) Inventors: Nobuyuki Kobayashi, Kobe; Hideaki Ueda, Kishiwada; Masako Iwamatsu, Toyonaka, all of (JP)

(73) Assignee: Minolta Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/312,739

(22) Filed: May 14, 1999

(30) Foreign Application Priority Data

May 15, 1998 (JP) .......................................... 10-133925

(51) Int. Cl.$^7$ ........................ C09K 19/22; C09K 19/12; C09K 19/30

(52) U.S. Cl. .............. 428/1.1; 252/299.63; 252/299.66; 252/299.67

(58) Field of Search ....................... 252/299.01, 299.67, 252/299.66, 299.63; 428/1.1

(56) References Cited

U.S. PATENT DOCUMENTS

| | | | | |
|---|---|---|---|---|
| 4,925,592 A | * 5/1990 | Kano | .................... | 252/299.67 |
| 5,147,577 A | * 9/1992 | Gray et al. | ............ | 252/399.62 |
| 5,156,763 A | * 10/1992 | Gray et al. | ............ | 252/299.67 |
| 5,334,327 A | * 8/1994 | Gray et al. | ............ | 252/299.67 |
| 5,387,371 A | * 2/1995 | Pausch et al. | ......... | 252/299.65 |
| 5,478,495 A | * 12/1995 | Terada et al. | .......... | 252/299.01 |
| 5,538,768 A | * 7/1996 | Marden et al. | ................ | 428/1 |
| 5,611,957 A | * 3/1997 | McDonnell et al. | ... | 252/299.01 |
| 5,798,058 A | * 8/1998 | Goodby et al. | ........ | 252/299.61 |
| 5,800,737 A | * 9/1998 | Chan | ..................... | 252/299.66 |
| 5,858,271 A | * 1/1999 | Sekiguchi et al. | ..... | 252/299.01 |
| 5,861,109 A | * 1/1999 | Goodby et al. | ........ | 252/299.65 |
| 5,955,000 A | * 9/1999 | Carrick et al. | ......... | 252/299.65 |
| 5,980,780 A | * 11/1999 | Motoyama et al. | .... | 252/299.64 |
| 6,015,507 A | * 1/2000 | Kobayashi et al. | .... | 252/299.01 |
| 6,274,208 B1 | * 8/2001 | Iwamatsu et al. | ............ | 428/1.1 |
| 6,287,647 B1 | * 9/2001 | Kobayashi et al. | .......... | 428/1.1 |

FOREIGN PATENT DOCUMENTS

| | | |
|---|---|---|
| JP | 4-130412 | * 5/1992 |
| JP | 5-224187 | 9/1993 |
| JP | 5-241119 | 9/1993 |

OTHER PUBLICATIONS

Cowie et al., Polymer 37 (22), 1996.*

* cited by examiner

*Primary Examiner*—Shean C. Wu
(74) *Attorney, Agent, or Firm*—Sidley Austin Brown & Wood

(57) ABSTRACT

A liquid crystal composition which contains nematic liquid crystal containing a liquid crystal ester compound and a chiral agent mainly containing an ester compound with no cholesterol rings. The liquid crystal composition exhibits a cholesteric phase in a room temperature. A liquid crystal display has substrates with ITO electrodes thereon and the liquid crystal composition between the substrates. The liquid crystal display further has a columnar structure formed in the liquid crystal composition.

35 Claims, 3 Drawing Sheets

F I G. 2 a
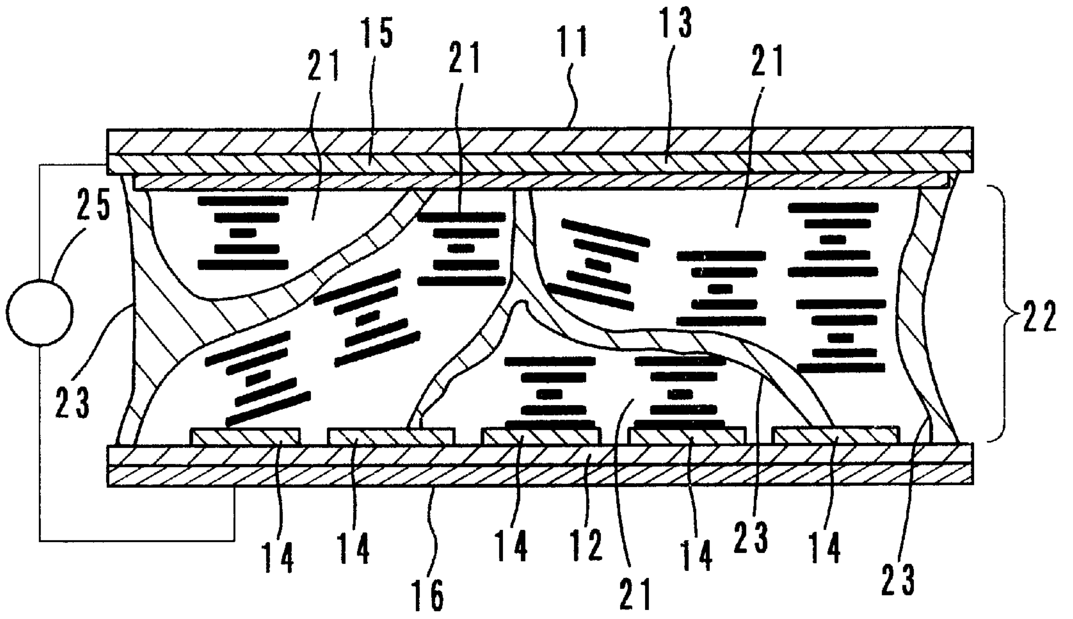
F I G. 2 b
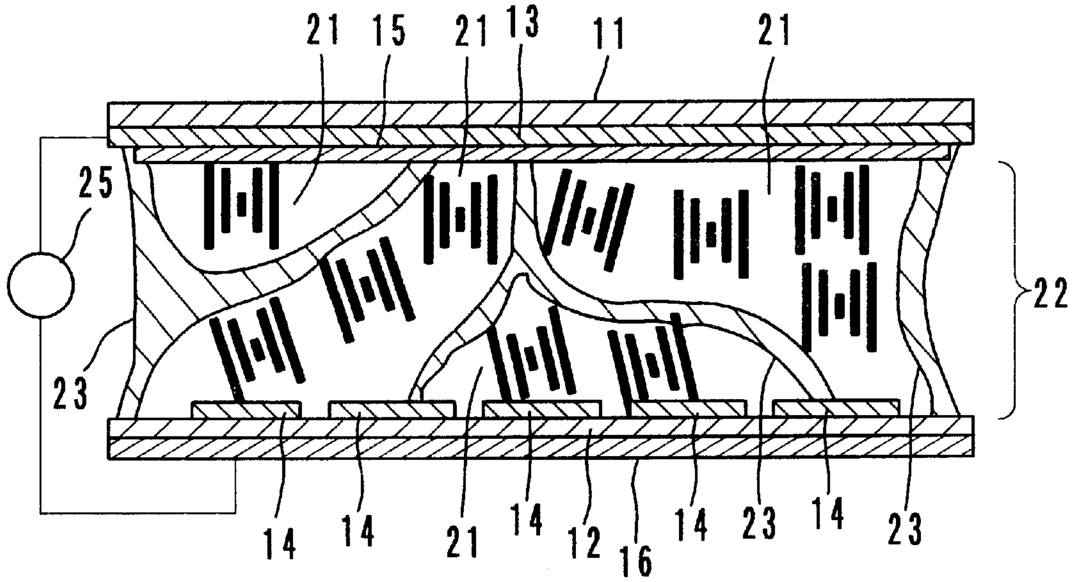

F I G. 3
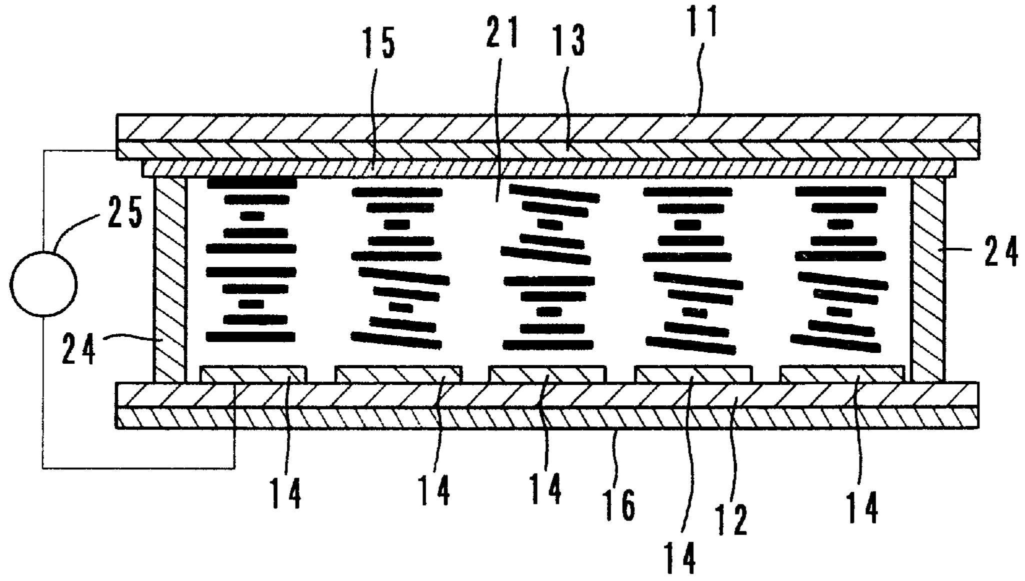
F I G. 4
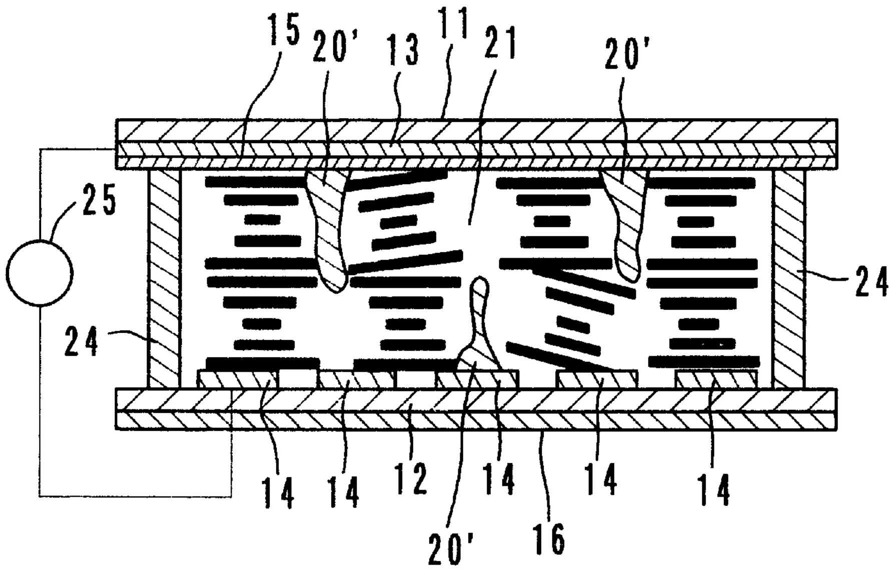

LIQUID CRYSTAL COMPOSITION AND LIQUID CRYSTAL DISPLAY PROVIDED WITH THE LIQUID CRYSTAL COMPOSITION

This application is based on application No. 10-133925 filed in Japan, the contents of which are hereby incorporated by reference.

BACKGROUND OF THE INVENTION

1. Field of the Invention

The present invention relates to a liquid crystal composition and a liquid crystal display provided with the liquid crystal composition, and more particularly to a bistable liquid crystal composition which exhibits a cholesteric phase at room temperature and a liquid crystal display provided with the liquid crystal composition.

2. Description of Related Art

Recently, studies have been made to develop reflective type liquid crystal displays by using chiral nematic liquid crystal which is made by adding a chiral agent to nematic liquid crystal to exhibit a cholesteric phase at room temperature. Such a liquid crystal display makes a display by switching between a planar state and a focal conic state in accordance with the energy of a voltage applied thereto.

At present, however, such a reflective liquid crystal display which uses chiral nematic liquid crystal does not have good contrast between the planar state and the focal conic state, and liquid crystal displays of this type which are satisfactory in reflectivity, contrast and so on are yet to be developed.

SUMMARY OF THE INVENTION

An object of the present invention is to provide a liquid crystal composition which is good in bistability, reflectivity and contrast and a liquid crystal display provided with the liquid crystal composition.

In order to attain the object, a liquid crystal composition according to the present invention comprises: a nematic liquid crystal material which contains a liquid crystal ester compound; and a chiral agent which mainly contains an ester compound with no cholesterol rings. A liquid crystal display according to the present invention comprises this liquid crystal composition between a pair of substrates, at least one of which is transparent.

The liquid crystal display according to the present invention, because it uses a liquid crystal ester compound, is improved in responsibility to a driving voltage, and especially improved in transparency, thereby resulting in a high contrast. Further, in prior art, the chiral agent added to the liquid crystal was an impurity which blocks the response to the driving voltage. According to the present invention, however, an ester compound which is similar to liquid crystal in structure is used as the main component of the chiral agent, which contributes to the improvement in reflective index characteristic and contrast.

BRIEF DESCRIPTION OF THE DRAWINGS

This and other objects and features of the present invention will be apparent from the following description with reference to the accompanying drawings, in which:

FIG. 2 is composed of FIGS. 2*a* and 2*b* which are sectional views of a liquid crystal display as the second embodiment of the present invention, FIG. 2*a* showing the liquid crystal display in a planar state and FIG. 2*b* showing the liquid crystal display in a focal conic state;

FIG. 3 is a sectional view of a liquid crystal display as the third embodiment of the present invention; and FIG. 4 is a sectional view of a liquid crystal display as the fourth embodiment of the present invention.

DETAILED DESCRIPTION OF THE PREFERRED EMBODIMENTS

Some embodiments of a liquid crystal composition and a liquid crystal display according to the present invention are described with reference to the accompanying drawings.

Structure and Display Operation of the First Embodiment

Figure 1A:
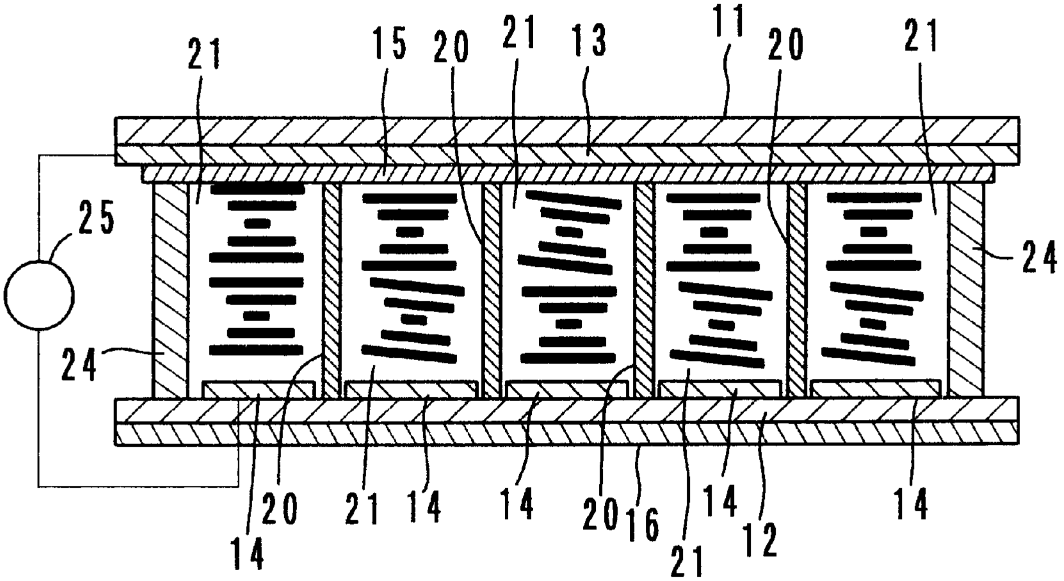
FIG. 1 is composed of FIGS. 1*a* and 1*b* which are sectional views of a liquid crystal display as the first embodiment of the present invention, FIG. 1*a* showing the liquid crystal display in a planar state and FIG. 1*b* showing the liquid crystal display in a focal conic state.
Figure 1B:
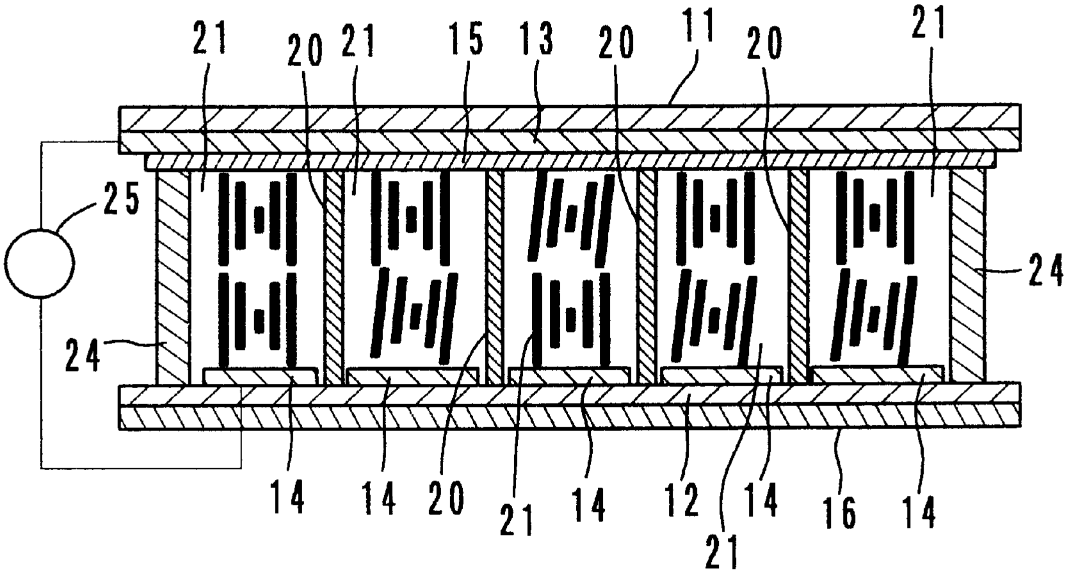

FIGS. 1*a* and 1*b* are sectional views of a liquid crystal display as the first embodiment of the present invention. FIG. 1*a* shows a planar state (RGB coloring state) wherein a high-voltage pulse signal is applied, and FIG. 1*b* shows a focal conic state (transparent/back displaying state) wherein a low-voltage pulse signal is applied. This liquid crystal display has a memorizing characteristic, and the planar state or the focal conic state is maintained even after the application of the pulse voltage.

In FIG. 1, the numbers 11 and 12 denote transparent substrates, and the numbers 13 and 14 denote transparent electrodes provided on the substrates 11 and 12. The electrodes 13 and 14 are in the form of strips. The electrodes 13 are juxtaposed in a direction, and the electrodes 14 are juxtaposed perpendicularly to the electrodes 13. In other words, the electrodes 13 and 14 are arranged in a matrix. On the electrode 13, preferably, an insulating layer 15 is coated. On the reverse side of the substrate 12, a visible light absorbing layer 16 is provided when necessary.

The number 20 denotes a columnar structure, and the number 21 denotes a liquid crystal composition which exhibits a cholesteric phase at room temperature. The materials of these members and the combination of the materials will be described in detail later with reference to specific examples. The number 24 is a seal which seals the liquid crystal composition 21 in a cell between the substrates 11 and 12. The number 25 denotes a pulse electric source which applies a specified pulse voltage to the electrodes 13 and 14.

The liquid crystal display of the structure above makes a display when a pulse voltage is applied from the electric source 25 to the electrodes 13 and 14. More specifically, because a liquid crystal composition which exhibits a cholesteric phase is used, the liquid crystal comes to a planar state when a relatively high pulse voltage is applied. In this state, the liquid crystal selectively reflects light of a wavelength depending on the cholesteric pitch and the refractive index. When a relatively low pulse voltage is applied to the liquid crystal, it comes to a focal conic state and becomes transparent. Further, when the visible absorbing layer 16 is provided as in the case of FIGS. 1*a* and 1*b*, the liquid crystal display makes a black display in the focal conic state.

In the liquid crystal display, the intersections between the electrodes 13 and 14, which are arranged in a matrix, are pixels. In the following description, an area where light modulation is carried out by the liquid crystal is referred to as display area, and the periphery where light modulation is not carried out is referred to as non-display area.

Substrate

At least one of the substrates 11 and 12 must be transparent. As the transparent substrate, not only glass but also flexible materials such as polycarbonate, polyether sulfone, polyethylene terephthalate, etc. can be used.

Electrode

As the electrodes 13 and 14, transparent conductive materials such as ITO (indium tin oxide), metal electrodes such as aluminum, silicone, etc. and photoconductive materials such as amolphous silicone, BSO (bismuth silicone oxide), etc. can be used. In order to make the electrodes 13 and 14 in the form of a matrix, for example, ITO layers are formed on the substrates 11 and 12 by a sputtering method or the like, and thereafter, patterning is carried out by a lithography method.

Insulating Layer, Aligning Layer

The insulating layer 15 is an inorganic layer of silicone oxide or an organic layer of polyimide resin, epoxy resin or the like. The insulating layer 15 is to prevent a short circuit between the electrodes 13 and 14 and functions as a gas barrier layer so as to improve the reliability of the liquid crystal. It is possible to provide aligning layers, typically made of polyimide resin, on the electrodes 13 and 14 when necessary. Also, it is possible to use the high-polymer material of the columnar structure 20 for the insulating layer and the aligning layers.

Spacers

Although not shown in FIG. 1, spacers may be inserted between the substrates 11 and 12. The spacers are spherical ones made of resin or inorganic oxide and are to maintain the gap between the substrates 11 and 12 even.

Liquid Crystal Composition

The liquid crystal composition contains nematic liquid crystal of which main component is a liquid crystal ester compound. Further, a chiral agent is added so that the liquid crystal composition will exhibit a cholesteric phase at room temperature, and moreover, a dye may be added.

The followings are general chemical formulas (A) and (A') of usable liquid crystal ester compounds and specific chemical formulas ($A_1$) through ($A_{70}$), ($A'_1$) through ($A'_{20}$,) and ($AA_1$) through ($AA_{40}$) of such compounds.

(A)

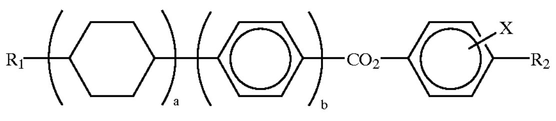

(A')

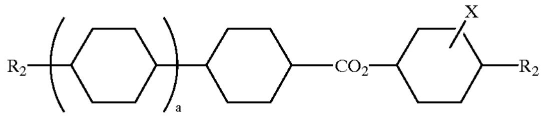

$R_1$, $R_2$: cyano group or alkyl group expressed by $-C_nH_{2n+1}$
(n: integer from 2 to 10)

X: halogen element or hydrogen atom a, b: 0 or 1 excepting that both are 0

($A_1$)

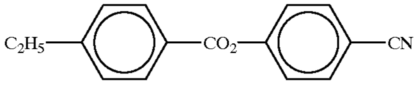

($A_2$)

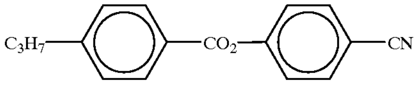

($A_3$)

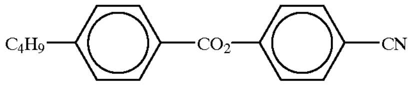

($A_4$)

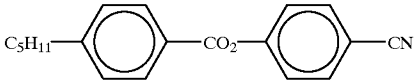

($A_5$)

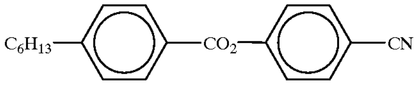

($A_6$)

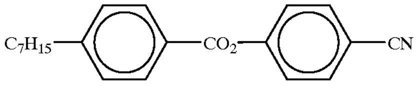

($A_7$)

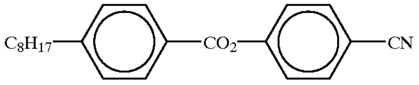

($A_8$)

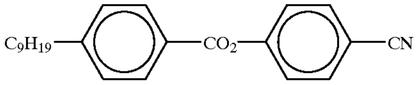

($A_9$)

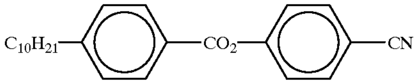

($A_{10}$)

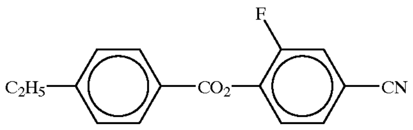

($A_{11}$)

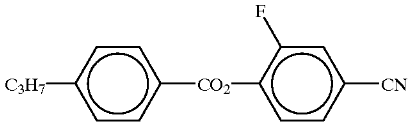

($A_{12}$)

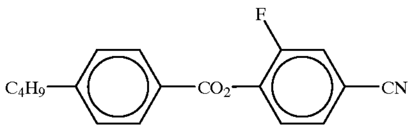

-continued
(A13)
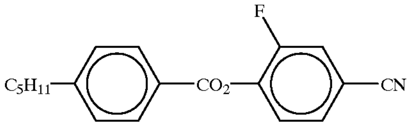
(A14)
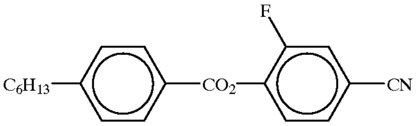
(A15)
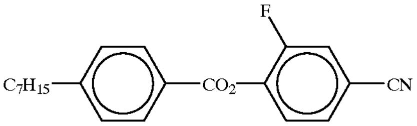
(A16)
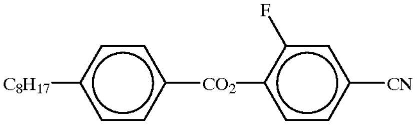
(A17)
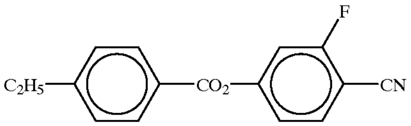
(A18)
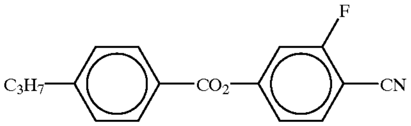
(A19)
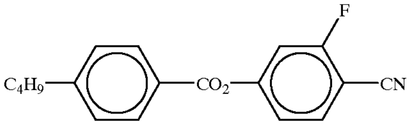
(A20)
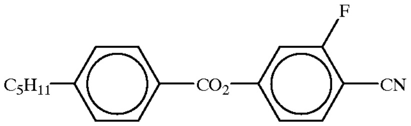
(A21)
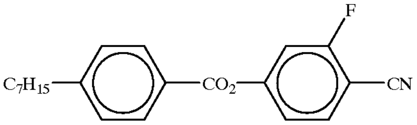
(A22)
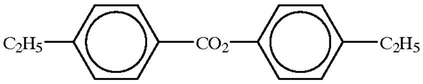
(A23)
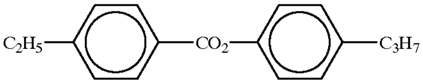
-continued
(A24)
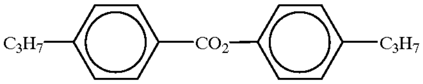
(A25)
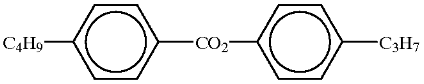
(A26)
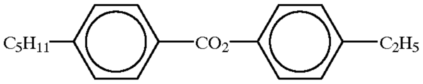
(A27)
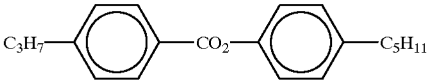
(A28)
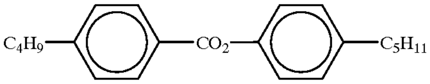
(A29)
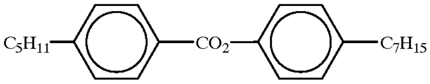
(A30)
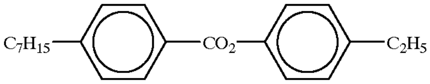
(A31)
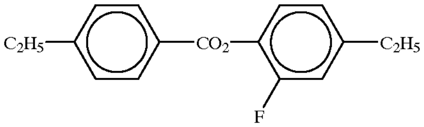
(A32)
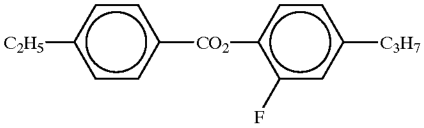
(A33)
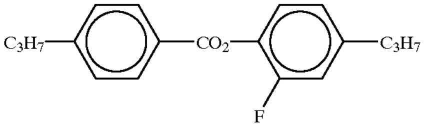
(A34)
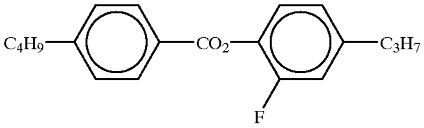
(A35)
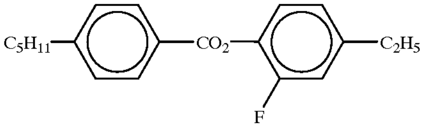

-continued
($A_{36}$)
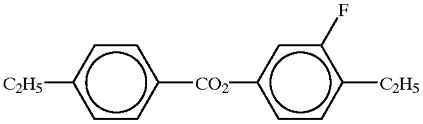
($A_{37}$)
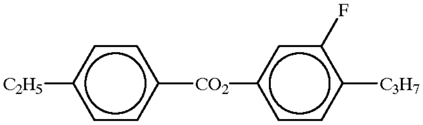
($A_{38}$)
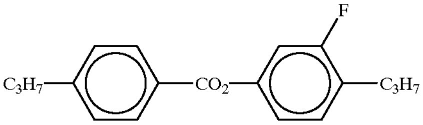
($A_{39}$)
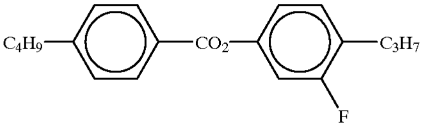
($A_{40}$)
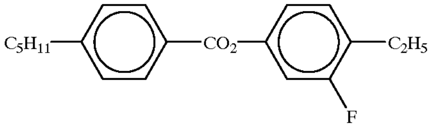
($A_{41}$)
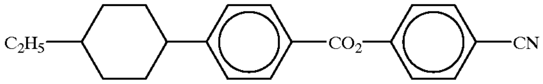
($A_{42}$)
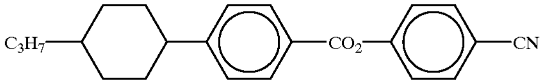
($A_{43}$)
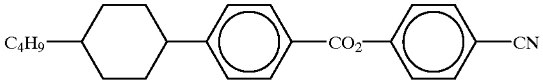
($A_{44}$)
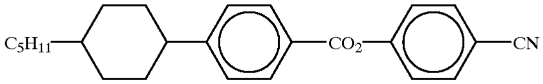
($A_{45}$)
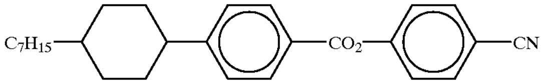
($A_{46}$)
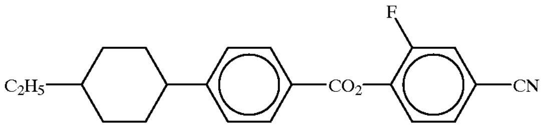
-continued
($A_{47}$)
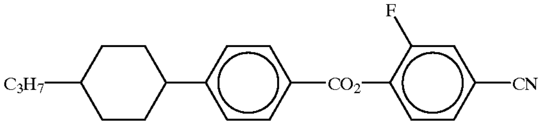
($A_{48}$)
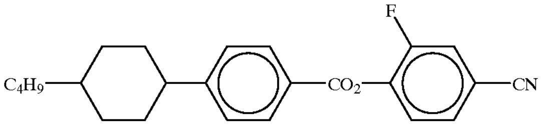
($A_{49}$)
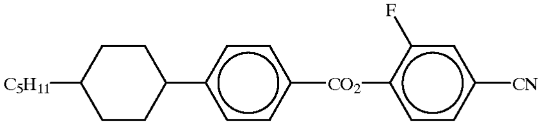
($A_{50}$)
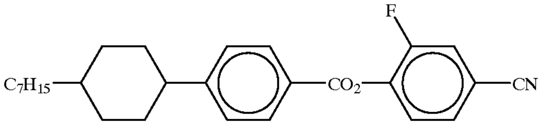
($A_{51}$)
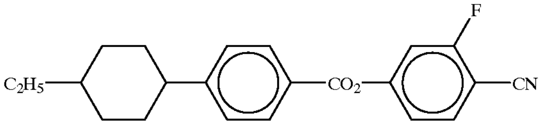
($A_{52}$)
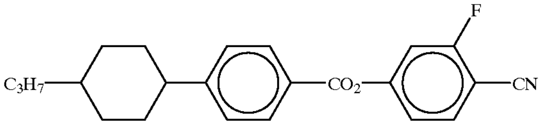
($A_{53}$)
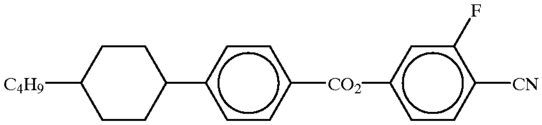
($A_{54}$)
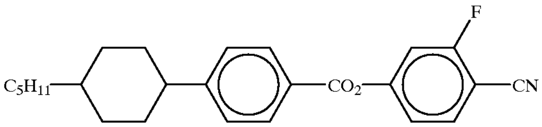
($A_{55}$)
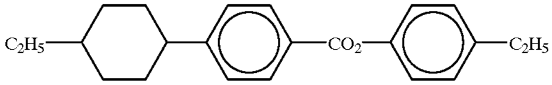
($A_{56}$)
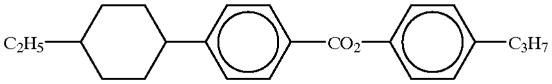

-continued
(A57)
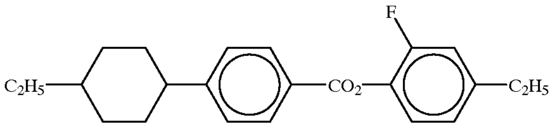
(A58)
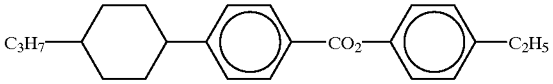
(A59)
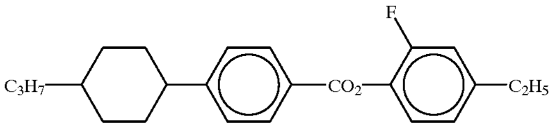
(A60)
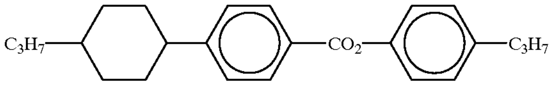
(A61)
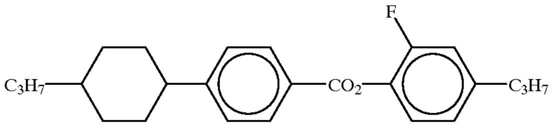
(A62)
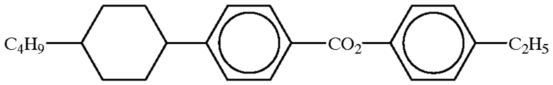
(A63)
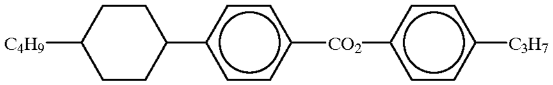
(A64)
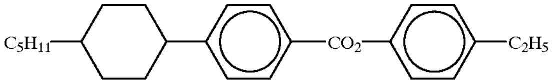
(A65)
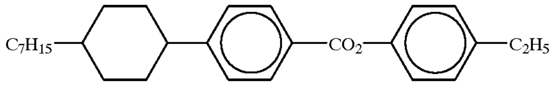
(A66)
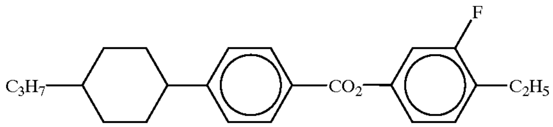
-continued
(A67)
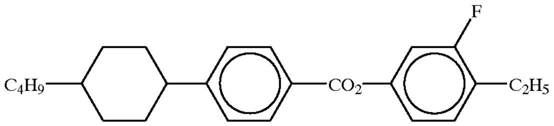
(A68)
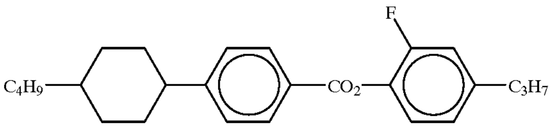
(A69)
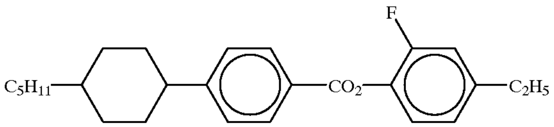
(A70)
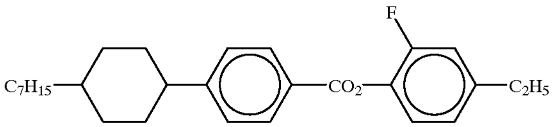
(A'1)
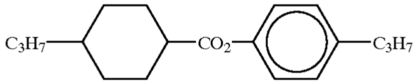
(A'2)
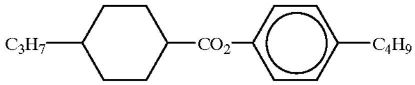
(A'3)
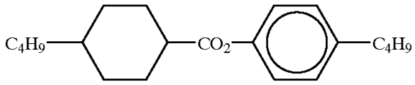
(A'4)
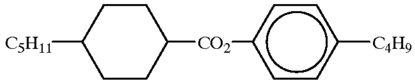
(A'5)
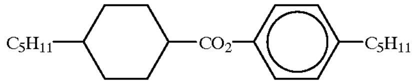
(A'6)
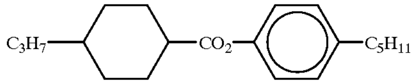
(A'7)
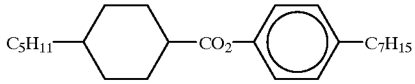
(A'8)
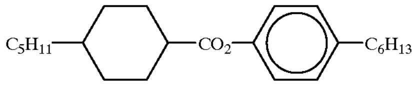

-continued
(A'9)
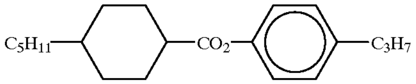
(A'10)
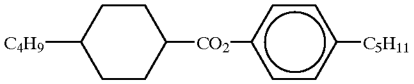
(A'11)
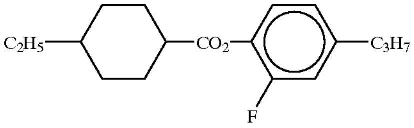
(A'12)
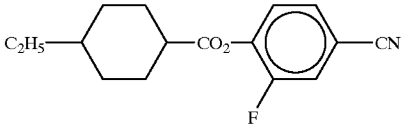
(A'13)
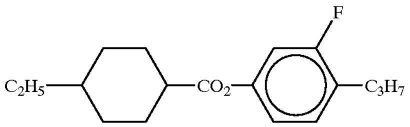
(A'14)
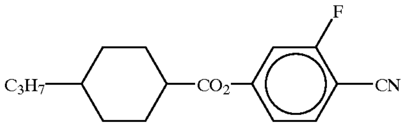
(A'15)
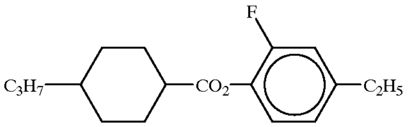
(A'16)
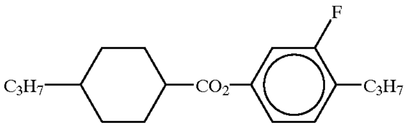
(A'17)
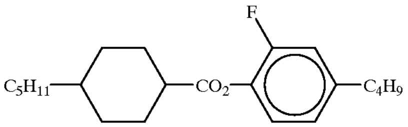
(A'18)
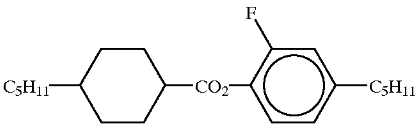
-continued
(A'19)
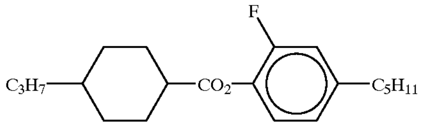
(A'20)
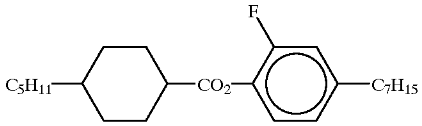
(AA1)
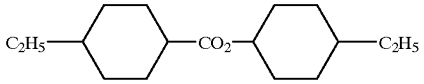
(AA2)
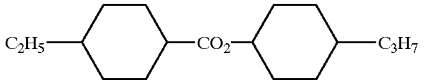
(AA3)
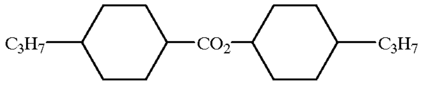
(AA4)
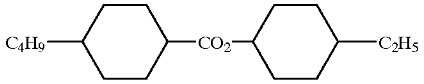
(AA5)
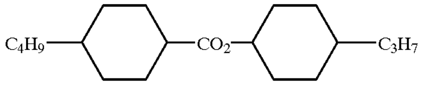
(AA6)
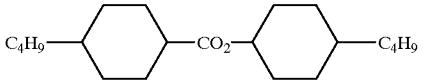
(AA7)
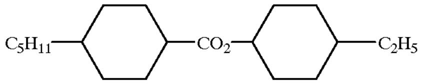
(AA8)
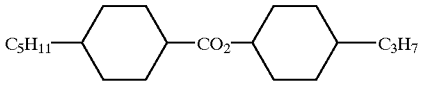

-continued
($AA_9$)
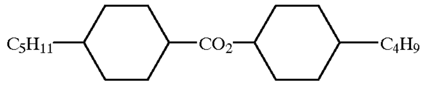
($AA_{10}$)
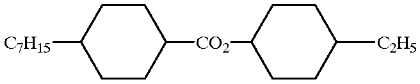
($AA_{11}$)
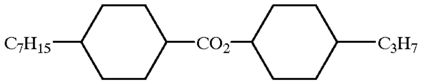
($AA_{12}$)
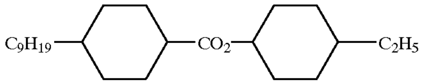
($AA_{13}$)
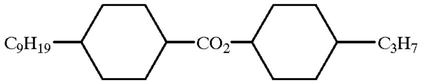
($AA_{14}$)
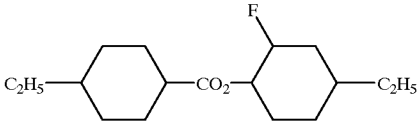
($AA_{15}$)
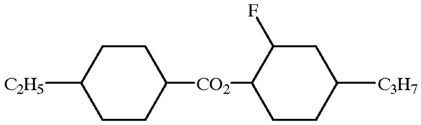
($AA_{16}$)
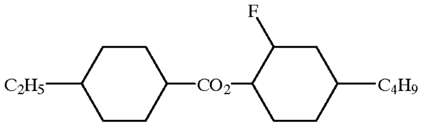
($AA_{17}$)
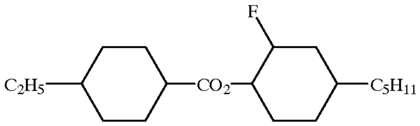
($AA_{18}$)
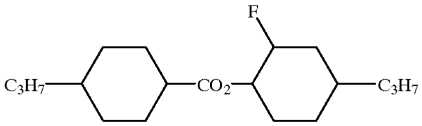
-continued
($AA_{19}$)
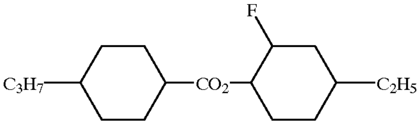
($AA_{20}$)
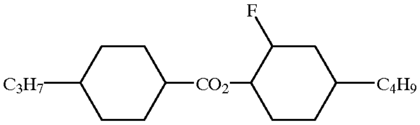
($AA_{21}$)
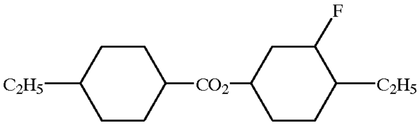
($AA_{22}$)
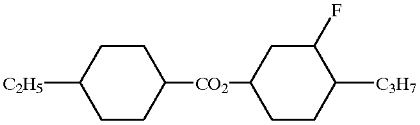
($AA_{23}$)
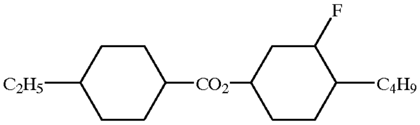
($AA_{24}$)
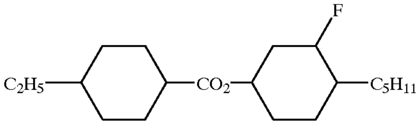
($AA_{25}$)
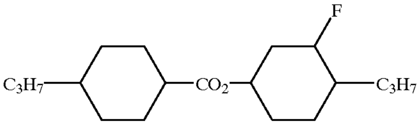
($AA_{26}$)
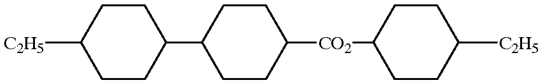
($AA_{27}$)
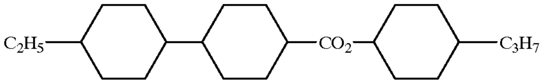

-continued (AA₂₈)

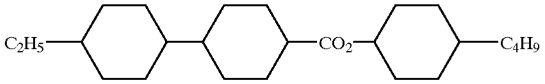

($AA_{29}$)

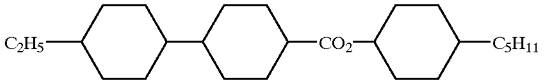

($AA_{30}$)

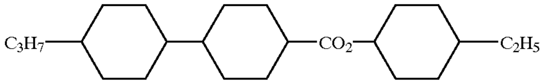

($AA_{31}$)

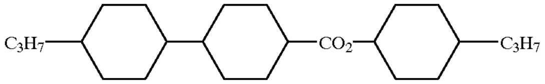

($AA_{32}$)

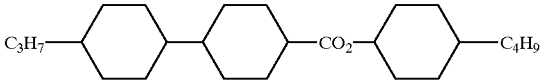

($AA_{33}$)

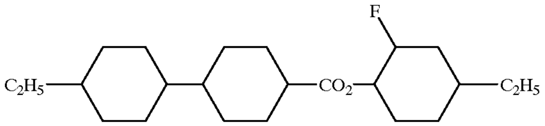

($AA_{34}$)

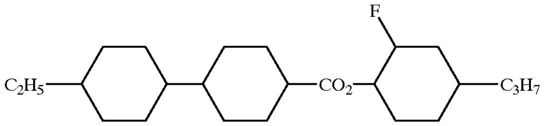

($AA_{35}$)

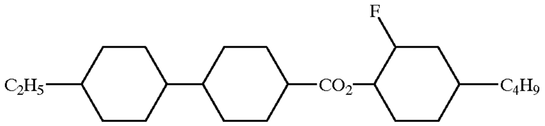

($AA_{36}$)

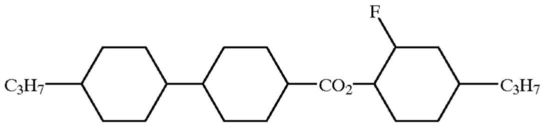

($AA_{37}$)

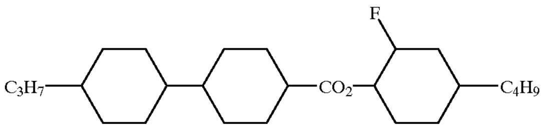

-continued ($AA_{38}$)

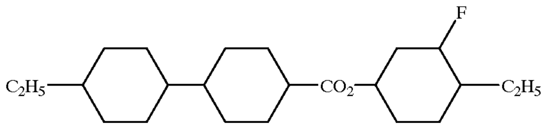

($AA_{39}$)

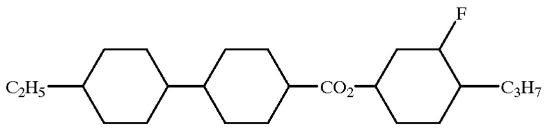

($AA_{40}$)

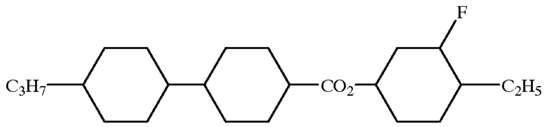

It is preferred that a compound with a cyano group at an end is used as the liquid crystal ester compound. Further, the liquid crystal composition may contain other liquid crystal compounds as subsidiary liquid crystal components. For example, liquid crystal tolan compounds, n-type liquid crystal compounds, liquid crystal phenyl cyclohexyle compounds and liquid crystal polycyclic compounds for regulating the phase transition temperature can be contained.

The liquid crystal ester compound is contained at more than 20 wt % of all the liquid crystal components, desirably not less than 40 wt % and more desirably not less than 50 wt %. Also, the liquid crystal ester compound is contained at not more than 70 wt % and preferably not more than 60 wt % of all the liquid crystal components.

The chiral agent to be added is an ester compound with no cholesterol rings, and preferably an ester compound of which main component is a polycyclic compound with an ester group. It is especially preferred that compounds shown by the following general chemical formulas ($C_1$) through ($C_4$) are used. The chiral agent is added at 5 wt % to 40 wt % of the liquid crystal components. If the chiral agent is added at less than 5 wt %, the liquid crystal composition may not make satisfactory performance of selective reflection of light with a desired wavelength. If the chiral agent is added at more than 40 wt %, the liquid crystal composition may not exhibit a cholesteric phase at room temperature.

($C_1$)

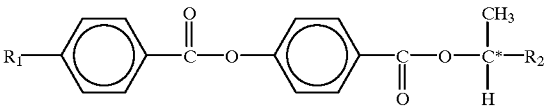

$R_1$: alkyl group ($C_2$–$C_{10}$) or alkoxyl group ($C_2$–$C_{10}$)

$R_2$: alkyl group ($C_2$–$C_{10}$)

(C2)

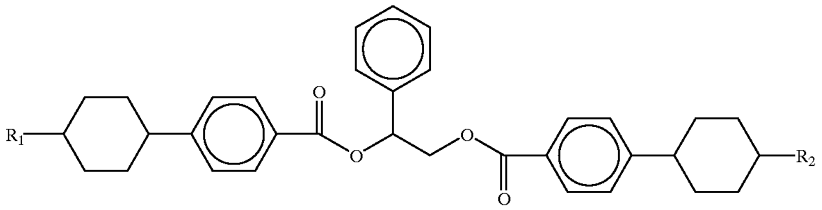

$R_1$, $R_2$: alkyl group ($C_1$–$C_{10}$) or alkoxyl group ($C_1$–$C_{10}$)

(C3)

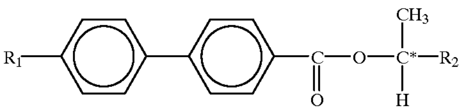

$R_1$: alkyl group ($C_1$–$C_{10}$) or alkoxyl group ($C_1$–$C_{10}$)

$R_2$: alkyl group ($C_2$–$C_{10}$)

(C4)

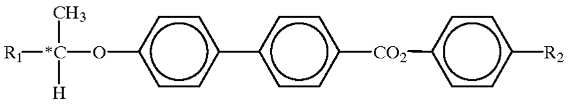

$R_1$: alkyl group ($C_2$–$C_{10}$) or alkoxyl group ($C_2$–$C_{10}$)
$R_2$: alkyl group ($C_1$–$C_{10}$)

Further, the following specific chemical formulas ($C_1$-1) through ($C_1$-10), ($C_2$-1) through ($C_2$-10), ($C_3$-1) through ($C_3$-10) and ($C_4$-1) through ($C_4$-10) show usable compounds out of the compounds shown by the general chemical formulas ($C_1$) through ($C_4$).

($C_1$-1)

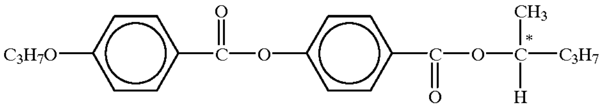

($C_1$-2)

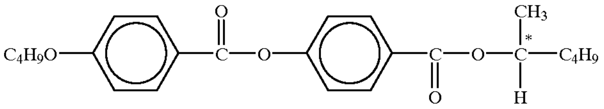

($C_1$-3)

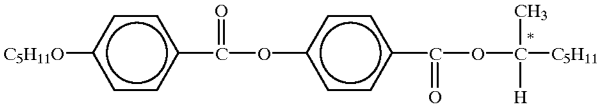

($C_1$-4)

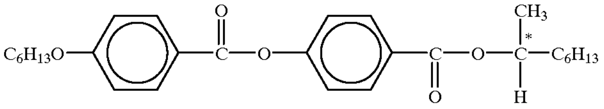

($C_1$-5)

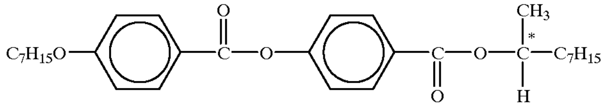

($C_1$-6)

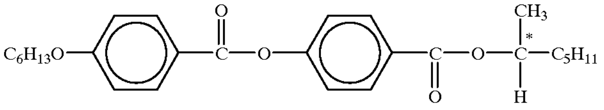

-continued
(C1-7)
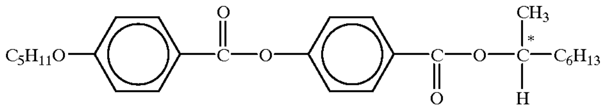
(C1-8)
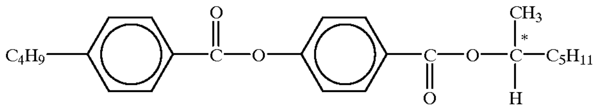
(C1-9)
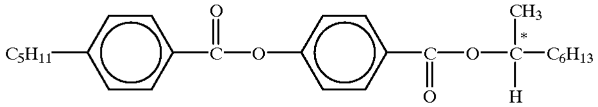
(C1-10)
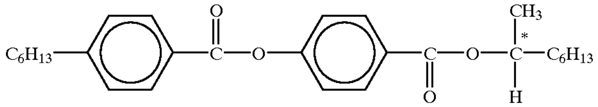
(C2-1)
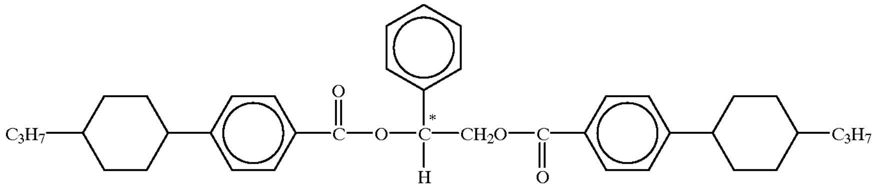
(C2-2)
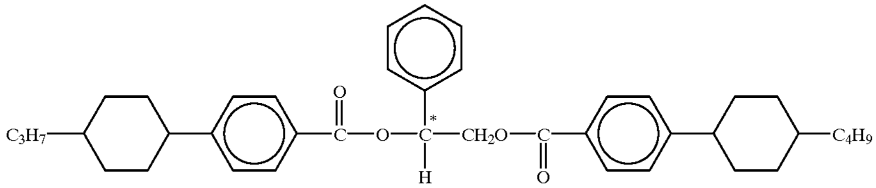
(C2-3)
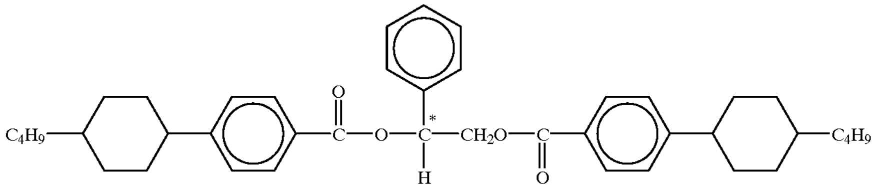
(C2-4)
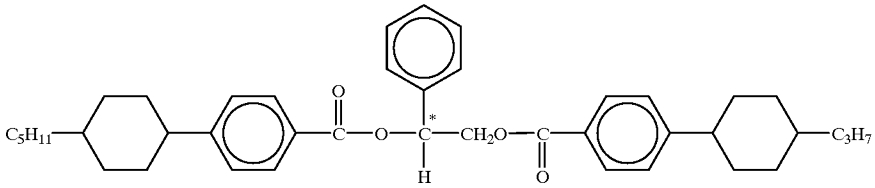
(C2-5)
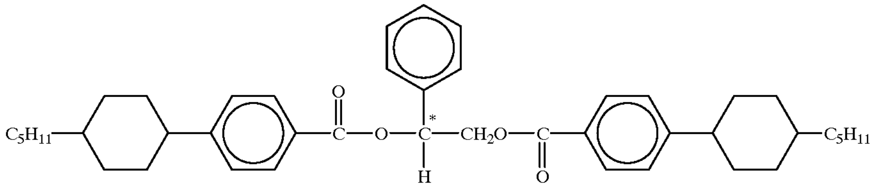

-continued
(C2–6)
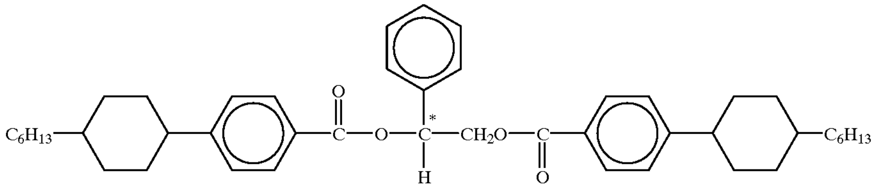
(C2–7)
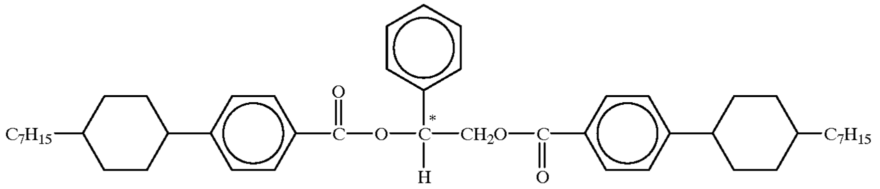
(C2–8)
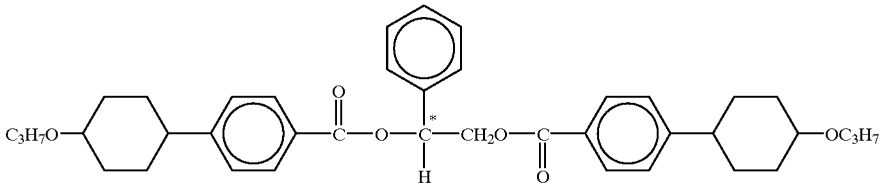
(C2–9)
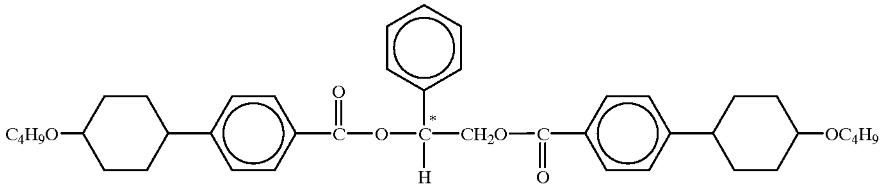
(C2–10)
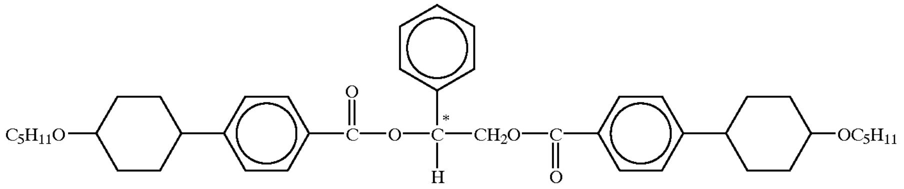
(C3–1)
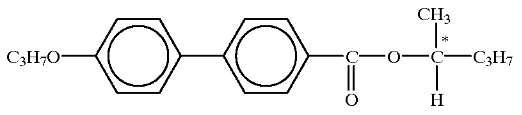
(C3–2)
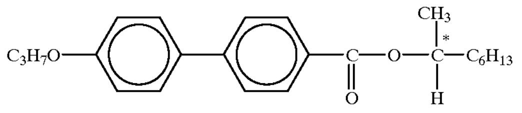
(C3–3)
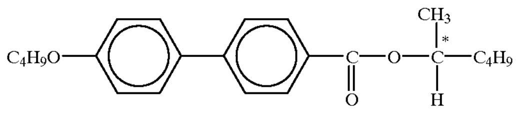

-continued
($C_3$-4)
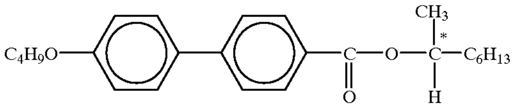
($C_3$-5)
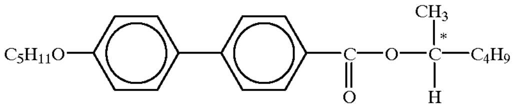
($C_3$-6)
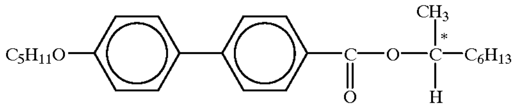
($C_3$-7)
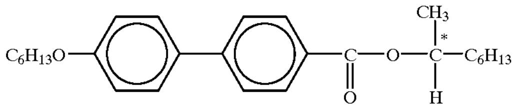
($C_3$-8)
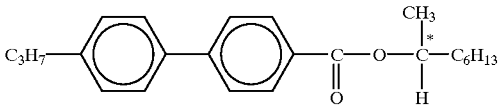
($C_3$-9)
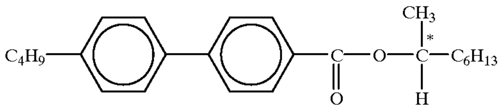
($C_3$-10)
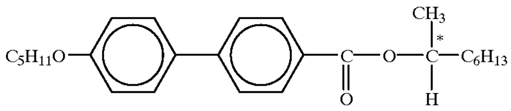
($C_4$-1)
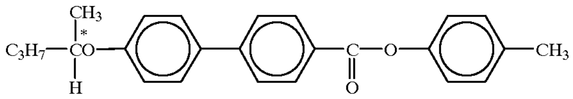
($C_4$-2)
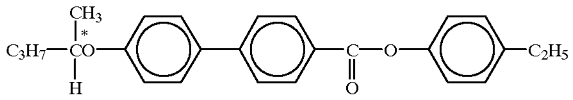
($C_4$-3)
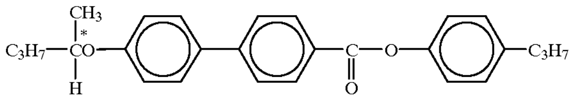
($C_4$-4)
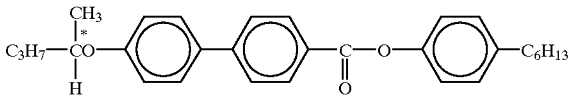

-continued ($C_4$-5)

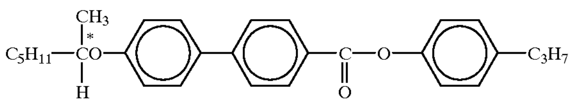

($C_4$-6)

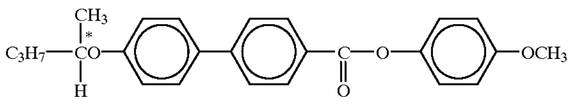

($C_4$-7)

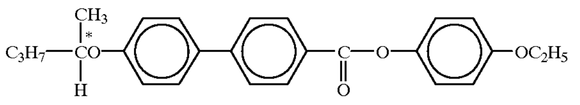

($C_4$-8)

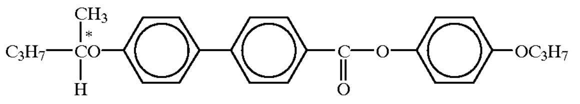

($C_4$-9)

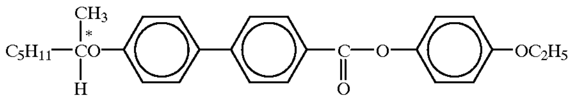

($C_4$-10)

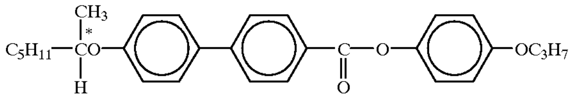

As the dye to be add(ed. various well-known dyes such as azo compounds, quinone compounds, anthraquinone compounds and dichroic dyes can be used, and also, two or more of these dyes can be used. The amount of dyes to be added is preferably not more than 3 wt % of the total amount of the liquid crystal components and the chiral agent.

Columnar Structure

With respect to the columnar structure 20, first, description is made from a structural view point.

The columnar structure 20 is, for example, composed of cylinders, square poles or elliptic cylinders which are arranged in a specified pattern such as a grating and stripes. The arrangement of the cylinders, square poles or elliptic cylinders is not random, and these columns may be arranged, for example, at uniform intervals, at gradually changing intervals, in periodically repeating specified patterns or the like. The arrangement is preferably such a type which enables the substrates 11 and 12 to keep a suitable space between each other and will never be obstructive to image display.

Various conventional methods can be adopted to form the columnar structure 20. For example, the following method can be adopted: a photosetting resin material is coated on one of the substrates; the other substrate is laid thereon; light of a specified wavelength is radiated via a mask with an opening of a specified pattern to polymerize the photosetting resin material; and the resin material coated on unnecessary portions is removed therefrom. Thereafter, the liquid crystal composition is filled between the substrates which sandwich the columnar structure by a vacuum injection method. Also, the following method is possible: a mixture of the liquid crystal composition and a photosetting resin material is coated on one of the substrates; the other substrate is laid thereon; and light of a specified wavelength is radiated via a mask with an opening of a specified pattern to polymerize the photosetting resin material and to separate the mixture into a solid phase of the resin material and a liquid crystal phase.

Structure of the Second Embodiment

FIG. 2 is a sectional view of a liquid crystal display as the second embodiment of the present invention. FIG. 2*a* shows a planar state (RGB coloring state) wherein a high-voltage pulse signal is applied, and FIG. 2*b* shows a focal conic state (transparent/back displaying state) wherein a low-voltage pulse signal is applied. As in the first embodiment, the planar state or the focal conic state is maintained even after the application of the pulse voltage.

This liquid crystal display is of a resin network type which has a composite layer 22 composed of a chiral nematic liquid crystal composition 21 and a three-dimensional resin network 23. This composite layer 22 is formed in the following way: a liquid crystal composition and a resin material with a polymerization initiator added thereto are mixed at a specified ratio; this is dropped on a substrate on which spacers have been dispersed; the other substrate is laid thereon and joined; and ultraviolet rays are radiated to polymerize the resin material. As the liquid crustal composition 21, the chiral nematic liquid crystal composition 21 which was described in connection with the first embodiment can be used. The other members are the same as those of the first embodiment, and these members are provided with the same reference symbols as shown in FIG. 1.

Structure of the Third Embodiment

FIG. 3 is a sectional view of a liquid crystal display as the third embodiment of the present invention. FIG. 3 shows a planar state wherein a high-voltage pulse signal is applied. This liquid crystal display is basically the same as the first embodiment; however, liquid crystal display of the third embodiment does not have a columnar structure in its display area. In FIG. 3, the same members as used in the first embodiment are provided with the same reference symbols as shown in FIG. 1.

Structure of the Fourth Embodiment

FIG. 4 is a sectional view of a liquid crystal display as the fourth embodiment of the present invention. FIG. 4 shows a planar state wherein a high-voltage pulse signal is applied. This liquid crystal display is basically the same as the third embodiment and further has a columnar structure 20'. The columnar structure 20' is composed of columns which extend to the middle portion of the space between the substrates 11 and 12. In FIG. 4, the same members as used in the first and third embodiments are provided with the same reference symbols as shown in FIGS. 1 and 3.

Experimental Example 1

To a nematic liquid crystal material (anisotropy of refractive index $\Delta n=0.17$, anisotropy of dielectric constant $\Delta\epsilon=30$, transition temperature to an isotropic phase $T_{NI}=90°$ C.) which contains a mixture of the liquid crystal ester compounds of the chemical formulas ($A_1$), ($A_2$), ($A_3$), ($A_4$), ($A_6$), ($A_{46}$), ($A_{47}$) and ($A_{49}$) at 50 wt % and further contains a liquid crystal phenyl cyclohexyl compound, a liquid crystal tolan compound and four-cyclic p-type liquid crystal, the chiral agent of the chemical formula ($C_1$-5) was added at 26.5 wt %. Thus, a liquid crystal composition which selectively reflects light of around 5,50 nm was prepared. This liquid crystal composition was filled between two glass substrates with transparent electrodes thereon. Spacer particles with a diameter of 10 $\mu$m were dispersed on one of the substrates beforehand, and thereby, a space of 10 $\mu$m was made between the substrates. In this way, a liquid crystal display of the structure shown by FIG. 3 was fabricated.

This liquid crystal display became green when a pulse voltage of 90V was applied between the electrodes for five milliseconds, and the Y value (luminous reflectance) at that time was 21. When a pulse voltage of 50V was applied for five milliseconds, the liquid crystal display became transparent, and the Y value was 3.0. Accordingly, in this liquid crystal display, the contrast was 7.

The measurement of the Y value was carried out by use of a spectrocolorimeter CM-3700d (made by Minolta Co., Ltd.). In the experimental examples and comparative examples below, the Y value was measured by use of the same spectrocolorimeter.

Comparative Example 1

To a nematic liquid crystal material (anisotropy of reflective index $\Delta n=0.18$, anisotropy of dielectric constant $\Delta\epsilon=12$, transition temperature to an isotropic phase $T_{NI}=70°$ C.) which contains a liquid crystal pyrimidine compound at 15 wt % and further contains a liquid crystal tolan compound, a bicyclic p-type liquid crustal and a liquid crystal phenyl cyclohexyl compound, the chiral agent of the chemical formula ($C_1$-5) was added at 22.5 wt %. Thus, a liquid crystal composition which selectively reflects light of about 550 nm was prepared. This liquid crystal composition was filled between two glass substrates with transparent electrodes thereon. Spacer particles with a diameter of 10 $\mu$m were dispersed on one of the substrates beforehand so that the space between the substrates would be 10 $\mu$m. In this way, a liquid crystal display of the structure shown by FIG. 3 was fabricated.

With respect to this liquid crystal display, when a pulse voltage of 100V was applied between the electrodes for five milliseconds, the liquid crystal showed green, and the Y value was 19. When a pulse voltage of 70V was applied for five milliseconds, the liquid crystal became transparent, and the Y value was 4.5. Accordingly, the contrast was 4.2.

Comparative Example 2

To a nematic liquid crustal material (anisotropy of refractive index $\Delta n=0.16$, anistropy of dielectric constant $\Delta\epsilon=8$, transition temperature to an isotropic phase $T_{NI}=80°$ C.) which contains a liquid crystal tolan compound at 15 wt % and further contains a liquid crystal pyrimidine compound, tricyclic p-type liquid crystal and n-type liquid crystal, the chiral agent of the chemical formula ($C_1$-5) was added at 22 wt %. Thus, a liquid crystal composition which selectively reflects light of around 550 nm was prepared. This liquid crystal composition was filled between two glass substrates with transparent electrodes thereon. Spacer particles with a diameter of 10 $\mu$m were dispersed on one of the substrates beforehand so that the space between the substrates would he 10 $\mu$m. In this way, a liquid crystal display of the structure shown by FIG. 3 was fabricated.

With respect to this liquid crystal display, when a pulse voltage of 90V was applied between the electrodes for five milliseconds, the crystal display showed green, and the Y value was 22. When a pulse voltage of 50V was applied for five milliseconds, the liquid crystal became transparent, and the Y value was 4.8. Accordingly, the contrast was 4.6.

Comparative Example 3

To a nematic liquid crystal material (anisotropy of refractive index $\Delta n=0.16$, anisotropy of dielectric constant $\Delta\epsilon=15$, transition temperature to an isotropic phase $T_{NI}=80°$ C.) which contains a mixture of the liquid crystal ester compounds of the chemical formulas ($A_{10}$), ($A_{11}$), ($A_{12}$), ($A_{13}$), ($A_{14}$), ($A_{15}$), ($A_{46}$), ($A_{47}$), ($A_{48}$) and ($A_{49}$)) at 50 wt % and further contains a liquid crustal phenyl cyclohexyl compound, a liquid crystal tolan compound and four-cyclic p-type liquid crystal, a chiral agent of the following chemical formula (D) was added at 38.1 wt %. Thus, a liquid crystal composition which selectively reflects light of around 550 nm was prepared. This liquid crystal composition was filled between two glass substrates with transparent electrodes thereon. Spacer particles with a diameter of 10 $\mu$m were dispersed on one of the substrates beforehand so that the space between the substrates would be 10 $\mu$m. In this way, a liquid crystal display of the structure shown by FIG. 3 was fabricated.

(D)

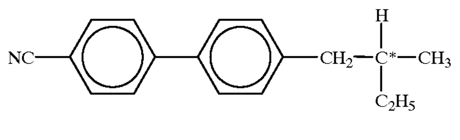

With respect to this liquid crystal display, when a pulse voltage of 80V was applied between the electrodes for five milliseconds, the liquid crystal showed green, and the Y value was 25. When a pulse voltage of 40V was applied for five milliseconds, the liquid crystal became transparent and the Y value was 5.7. Accordingly, the contrast was 4.4.

Comparative Example 4

To a nematic liquid crystal material (anisotropy of refractive index $\Delta n=0.18$, anisotropy of dielectric constant $\Delta\epsilon=$13, transition temperature to an isotropic phase $T_{NI}=75°$ C.) which contains a liquid crystal cyano biphenyl compound at 50wt % and tricyclic p-type liquid crystal and does not contain any liquid crystal ester compounds, the chiral agent of the chemical formula ($C_1$-5) was added at 38 wt %. Thus, a liquid crystal composition which selectively reflects light of around 550 nm was prepared. This liquid crystal composition was filled between two glass substrates with transparent electrodes thereon. Spacer particles with a diameter of 10 $\mu$m were dispersed on one of the substrates beforehand so that the space between the glass substrates would be 10 $\mu$m. In this way, a liquid crystal display of the structure shown by FIG. 3 was fabricated.

With respect to this liquid crystal display, when a pulse voltage of 100V was applied between the electrodes for five milliseconds, the liquid crystal showed green, and the Y value was 25. When a pulse voltage of 60V was applied for five milliseconds, the liquid crystal became transparent, and the Y value was 7.2. Accordingly, the contrast was 3.5.

Experimental Example 2

To a nematic liquid crystal material (anisotropy of refractive index $\Delta n$=0.16, anisotropy of dielectric constant $\Delta\epsilon$=16, transition temperature to an isotropic phase $T_{NI}$=83° C.) which contains a mixture of the liquid crystal ester compounds of the chemical formulas ($A_4$), ($A_5$), ($A_6$), ($A_{11}$), ($A_{12}$), ($A_{13}$), ($A_{14}$), ($A_{46}$), ($A_{47}$), ($AA_3$), ($AA_8$) and ($A'_2$) at 60 wt % and further contains a liquid crystal phenyl cyclohexyl compound, a liquid crystal tolan compound and four-cyclic p-type liquid crystal, a chiral agent of the chemical formula ($C_1$-4) was added at 27.5 wt %. Thus, a liquid crystal composition which selectively reflects light of around 550 nm was prepared. This liquid crystal composition was filled between two glass substrates with transparent electrodes thereon. Spacer particles with a diameter of 10 $\mu$m in were dispersed on one of the substrates beforehand so that the space between the substrates would be 10 $\mu$m. In this way, a liquid crystal display of the structure shown by FIG. 3 was fabricated.

With respect to this liquid crystal display, when a pulse voltage of 90V was applied between the electrodes for five milliseconds, the liquid crystal showed green, and the Y value was 23. When a pulse voltage of 50V was applied for five milliseconds, the liquid crystal became transparent, and the Y value was 3.2. Accordingly, the contrast was 7.2.

Experimental Example 3

To a nematic liquid crystal material (anisotropy of refractive index $\Delta n$=0.16, anisotropy of dielectric constant $\Delta\epsilon$=15, transition temperature to an isotropic phase $T_{NI}$=85° C.) which contains a mixture of the liquid crystal ester compounds of the chemical formulas ($A_{10}$), ($A_{11}$), ($A_{12}$), ($A_{13}$), ($A_{14}$), ($A_{15}$), ($A_{46}$), ($A_{47}$), ($A_{48}$) and ($A_{49}$)) at 55 wt % and further contains a liquid crystal phenyl cyclohexyl compound, a liquid crystal tolan compound and four-cyclic p-type liquid crystal, the chiral agent of the chemical formula ($C_1$-6) was added at 27 wt %. Thus, a liquid crystal composition which selectively reflects light of around 550 nm was prepared. This liquid crystal composition was filled between two glass substrates with transparent electrodes thereon. Spacer particles with a diameter of 10 $\mu$m were dispersed on one of the substrates beforehand so that the space between the substrates would be 10 $\mu$m. In this way, a liquid crystal display of the structure shown by FIG. 3 was fabricated.

With respect to this liquid crystal display, when a pulse voltage of 90V was applied between the electrodes for five milliseconds, the liquid crystal showed green, and the Y value was 24. When a pulse voltage of 50V was applied for five milliseconds, the liquid crystal became transparent, and the Y value was 3.4. Accordingly, the contrast was 7.1.

Experimental Example 4

To a nematic liquid crystal material (anisotropy of refractive index $\Delta n$=0.17, anisotropy of dielectric constant $\Delta\epsilon$=14.5, transition temperature to an isotropic phase $T_{NI}$=90° C.) which contains a mixture of the liquid crystal ester compounds of the chemical formulas ($A_1$), ($A_2$), ($A_3$), ($A_4$), ($A_{11}$), ($A_{12}$), ($A_{46}$), ($A_{47}$) and ($A_{49}$) at 50 wt % and further contains a liquid crystal phenyl cyclohexyl compound, a liquid crystal tolan compound and four-cyclic p-type liquid crystal, the chiral agent of the chemical formula ($C_2$-5) was added at 26 wt %. Thus, a liquid crystal composition which selectively reflects light of around 550 nm was prepared. This liquid crystal composition was filled between two glass substrates with transparent electrodes thereon. Spacer particles with a diameter of 10 $\mu$m were dispersed on one of the substrates beforehand so that the space between the substrates would be 10 $\mu$m. In this way, a liquid crystal display of the structure shown by FIG. 3 was fabricated.

With respect to this liquid crystal display, when a pulse voltage of 90V was applied between the electrodes for five milliseconds, the liquid crystal showed green, and the Y value was 20. When a pulse voltage of 50V was applied for five milliseconds, the liquid crystal became transparent, and the Y value was 4.0. Accordingly, the contrast was 5.0.

Experimental Example 5

To a nematic liquid crystal material (anisotropy of refractive index $\Delta n$=0.17, anisotropy of dielectric constant $\Delta\epsilon$=20, transition temperature to an isotropic phase $T_{NI}$=87° C.) which contains a mixture of the liquid crystal ester compounds of the chemical formulas ($A_3$), ($A_4$), ($A_5$), ($A_{10}$), ($A_{11}$), ($A_{12}$), ($A_{47}$), ($A_{48}$), ($A_{49}$) and ($A_{51}$) at 53 wt % and further contains a liquid crystal phenyl cvclohexyl compound, a liquid crystal tolan compound and four-cyclic p-type liquid crystal, the chiral agent of the chemical formula ($C_4$-7) was added at 26.5 wt %. Thus, a liquid crystal composition which selectively reflects light of around 550 nm was prepared. On a substrate, a columnar structure with a height of 10 $\mu$m was made of an ultraviolet-setting resin material by a mask exposure method. This liquid crystal composition was filled between this substrate and another substrate, and in this way, a liquid crystal display of the structure shown by FIG. 3 was fabricated.

With respect to this liquid crystal display, when a pulse voltage of 90V was applied between the electrodes for five milliseconds, the liquid crystal showed red, and the Y value was 21. When a pulse voltage of 50V was applied for five milliseconds, the liquid crustal became transparent, and the Y value was 3.5. Accordingly, the contrast was 6.0.

Experimental Example 6

To a nematic liquid crystal material (anisotropy of refractive index $\Delta n$=0.16, anisotropy of dielectric constant $\Delta\epsilon$=25, transition temperature to an isotropic phase $T_{NI}$=85° C.) which contains a mixture of the liquid crystal ester compounds of the chemical formulas ($A_1$. ($A_2$), ($A_3$), ($A_4$), ($A_6$), ($A_{46}$), ($A_{47}$), ($A_{49}$) and ($A_{51}$) at 50 wt % and further contains a liquid crystal phenyl cyclohexyl compound, a liquid crystal tolan compound and four-cyclic p-type liquid crystal, the chiral agent of the chemical formula ($C_3$-7) was added at 26 wt %. Thus, a liquid crystal composition which selectively reflects light of around 550 nm was prepared. This liquid crystal composition and an adamantyl methacrylate compound (resin) with a photopolymerization initiator added thereto were mixed with each other at a ratio by weight of 85:15, and this mixture was filled between substrates with electrodes formed thereon in such a way that the space between the substrates would be 10 $\mu$m. Then, ultraviolet rays of 15 mw/$cm^2$ were radiated for five minutes, and thereby, the resin contained in the mixture was polymerized. Thus, a composite layer with a resin network was formed. In this way, a liquid crystal display of the resin network type shown by FIG. 2 was fabricated.

With respect to this liquid crystal display, when a pulse voltage of 110V was applied between the electrodes for five milliseconds, the liquid crystal showed green, and the Y value was 20. When a pulse voltage of 70V was applied for five milliseconds, the liquid crystal became transparent, and the Y value was 5.0. Accordingly, the contrast was 4.0.

Comparative Example 5

To a nematic liquid crystal material (anisotropy of refractive index Δn=0.23, anisotropy of dielectric constant Δε=16.2, transition temperature to an isotropic phase $T_{NI}$=61.5° C.) which contains a liquid crystal cyano biphenyl compound at 50 wt % and does not contain any liquid crystal ester compounds, the chiral agent of the chemical formula ($C_2$-5) was added at 36.5 wt %. Thus, a liquid crystal composition which selectively reflects light of around 550 nm was prepared. This liquid crystal composition and an adamantyl methacrylate compound with a photopolymerization initiator added thereto were mixed with each other at a ratio by weight of 85:15, and the resulting mixture was filled between substrates with electrodes formed thereon in such a way that the space between the substrates would be 10 μm. Then, ultraviolet rays of 15 mw/cm$^2$ were radiated for five minutes, and thereby, the resin contained in the mixture was polymerized. Thus, a composite layer with a resin network was formed. In this way, a liquid crystal display of the resin network type shown by FIG. 2 was fabricated.

With respect to this liquid crystal display, when a pulse voltage of 110V was applied between the electrodes for five milliseconds, the liquid crystal showed green, and the Y value was 15. When a pulse voltage of 70V was applied for five milliseconds, the liquid crystal became transparent, and the Y value was 8.0. Accordingly, the contrast was 1.88.

Comparative Example 6

To a nematic liquid crystal material (anisotropy of refractive index Δn=0.16, anisotropy of dielectric constant Δε=25, transition temperature to an isotropic phase $T_{NI}$=85° C.) which contains a mixture of the liquid crystal ester compounds of the chemical formulas ($A_1$), ($A_2$), ($A_3$), ($A_4$), ($A_6$), ($A_{46}$), ($A_{47}$) ($A_{49}$) and ($A_{51}$) at 50 wt % and further contains a liquid crystal phenyl cyclohexyl compound, a liquid crystal tolan compound and four-cyclic p-type liquid crystal, pelargonic acid cholesterol (see chemical formula (E)) was added at 31.5 wt % as a chiral agent. Thus, a liquid crystal composition which selectively reflects light of around 550 nm was prepared. This liquid crystal composition and an adamantyl methacrylate compound with a photopolymerization initiator added thereto were mixed with each other at a ratio by weight of 85:15, and this mixture was filled between substrates with electrodes formed thereon in such a way that the space between the substrates would be 10 μm. Then, ultraviolet rays of 15 mw/cm$_2$ were radiated for five minutes, and thereby, the resin contained in the mixture was polymerized. Thus, a composite layer with a resin network was formed. In this way, a liquid crystal display of the resin network type shown by FIG. 2 was fabricated.

(E)

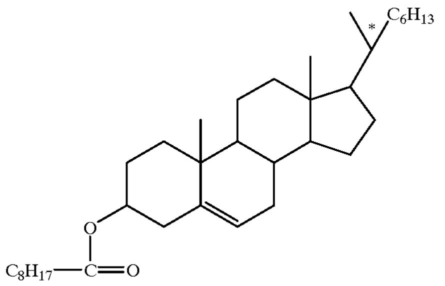

With respect to this liquid crystal display, when a pulse voltage of 110V was applied between the electrodes for five milliseconds, the liquid crystal showed green, and the Y value was 16. When a pulse voltage of 70V was applied for five milliseconds, the liquid crystal became transparent, and the Y value was 8.0. Accordingly, the contrast was 2.0.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A liquid crystal composition which exhibits a cholesteric phase at room temperature, and which exhibits bistability between a focal conic state and a planar state, said liquid crystal composition comprising:

a nematic liquid crystal material which comprises a liquid crystal ester compound and at least one kind of liquid crystal compound that is of a different kind from said liquid crystal ester compound, said liquid crystal ester compound constituting at least 40 weight percent of said nematic liquid crystal material; and a chiral agent which contains an ester compound with no cholesterol rings, said liquid crystal composition containing said chiral agent in an amount sufficient to exhibit a cholesteric phase at room temperature.

2. A liquid crystal composition as claimed in claim 1, wherein the liquid crystal ester compound has a cyano group at an end of the liquid crystal ester compound.

3. A liquid crystal composition as claimed in claim 1, wherein the ester compound which does not contain any cholesterol rings and which is contained in the chiral agent is a polycyclic compound with an ester group.

4. A liquid crystal display comprising:

a pair of substrates, at least one of which is transparent; and a liquid crystal composition which is disposed between said pair of substrates and which exhibits a cholesteric phase at room temperature, said liquid crystal composition comprising:

a nematic liquid crystal material which comprises a liquid crystal ester compound and at least one kind of liquid crystal compound that is of a different kind from said liquid crystal ester compound, said liquid crystal ester compound constituting at least 40 weight percent of said nematic liquid crystal material; and a chiral agent which contains an ester compound with no cholesterol rings, said liquid crystal composition containing said chiral agent in an amount sufficient to exhibit a cholesteric phase at room temperature;

wherein said liquid crystal composition exhibits bistability between a focal conic state and a planar state.

5. A liquid crystal display as claimed in claim 4, wherein the liquid crystal ester compound has a cyano group at an end of the liquid crystal ester compound.

6. A liquid crystal display as claimed in claim 4, wherein the ester compound which does not contain any cholesterol rings and which is contained in the chiral agent is a polycyclic compound with an ester group.

7. A liquid crystal composition as claimed in claim 1, wherein said liquid crystal composition selectively reflects light within visible wavelengths when said liquid crystal composition is in the planar state.

8. A liquid crystal composition as claimed in claim 1, wherein said liquid crystal ester compound constitutes at least 50 weight percent of said nematic liquid crystal material.

9. A liquid crystal composition as claimed in claim 1, wherein said liquid crystal ester compound constitutes not more than 70 weight percent of said nematic liquid crystal material.

10. A liquid crystal composition as claimed in claim 1, wherein said liquid crystal ester compound constitutes at least 50 weight percent and not more than 70 weight percent of said nematic liquid crystal material.

11. A liquid crystal composition as claimed in claim 10, wherein said liquid crystal ester compound constitutes at least 50 weight percent and not more than 60 weight percent of said nematic liquid crystal material.

12. A liquid crystal composition as claimed in claim 1, wherein a concentration of said chiral agent in said liquid crystal composition is in the range of 5 weight percent to 40 weight percent of said nematic liquid crystal material.

13. A liquid crystal composition as claimed in claim 1, wherein said liquid crystal ester compound is at least one compound selected from the group consisting of compounds having the formula:

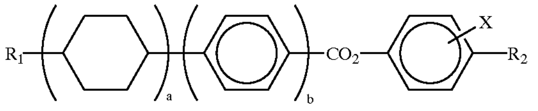

and compounds having the formula:

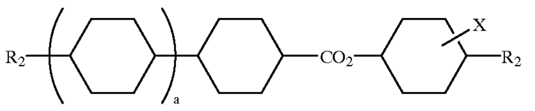

wherein each of $R_1$ and $R_2$ is selected from the group consisting of a cyano group and an alkyl group expressed by $—C_nH_{2n+1}$ where n is an integer in the range of 2 to 10;

wherein X is a halogen element or a hydrogen atom;

wherein each of a and b is 0 or 1, provided that at least one of a and b is 1.

14. A liquid crystal composition as claimed in claim 1, wherein said chiral agent is at least one compound selected from the group consisting of compounds having the formula:

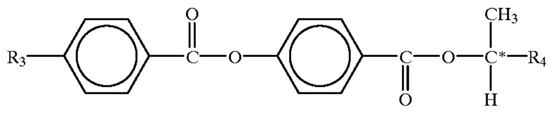

wherein $R_3$ is an alkyl group containing from 2 to 10 carbon atoms or an alkoxyl group containing from 2 to 10 carbon atoms, and wherein $R_4$ is an alkyl group containing from 2 to 10 carbon atoms;

compounds having the formula:

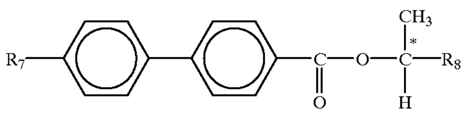

wherein $R_7$ is an alkyl group containing from 1 to 10 carbon atoms or an alkoxyl group containing from 1 to 10 carbon atoms, and wherein $R_8$ is an alkyl group containing from 2 to 10 carbon atoms; and compounds having the formula:

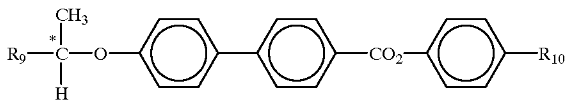

wherein $R_9$ is an alkyl group containing from 2 to 10 carbon atoms or an alkoxyl group containing from 2 to 10 carbon atoms, and wherein $R_{10}$ is an alkyl group containing from 1 to 10 carbon atoms.

15. A liquid crystal display as claimed in claim 4, wherein said liquid crystal composition selectively reflects light within visible light wavelengths when said liquid crystal composition is in the planar state.

16. A liquid crystal display as claimed in claim 4, wherein said liquid crystal ester compound constitutes at least 50 weight percent of said nematic liquid crystal material.

17. A liquid crystal display as claimed in claim 4, wherein said liquid crystal ester compound constitutes not more than 70 weight percent of said nematic liquid crystal material.

18. A liquid crystal display as claimed in claim 17, wherein said liquid crystal ester compound constitutes at least 50 weight percent and not more than 70 weight percent of said nematic liquid crystal material.

19. A liquid crystal display as claimed in claim 4, wherein said liquid crystal ester compound constitutes at least 50 weight percent and not more than 60 weight percent of said nematic liquid crystal material.

20. A liquid crystal display as claimed in claim 4, wherein a concentration of said chiral agent in said liquid crystal composition is in the range of 5 weight percent to 40 weight percent of said nematic liquid crystal material.

21. A liquid crystal display as claimed in claim 4, wherein said liquid crystal ester compound is at least one compound selected from the group consisting of compounds having the formula:

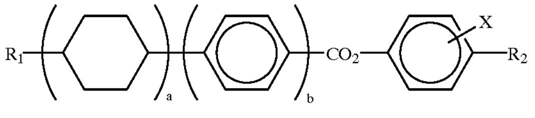

and compounds having the formula:

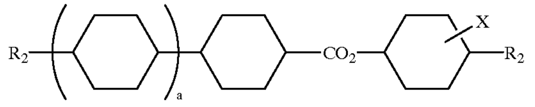

wherein each of $R_1$ and $R_2$ is selected from the group consisting of a cyano group and an alkyl group expressed by $—C_nH_{2n+1}$ wherein is an integer in the range of 2 to 10;

wherein X is a halogen element or a hydrogen atom;

wherein each of a and b is 0 or 1, provided that at least one of a and b is 1.

22. A liquid crystal display as claimed in claim 4, wherein said chiral agent with no cholesterol rings is at least one compound selected from the group consisting of compounds having the formula:

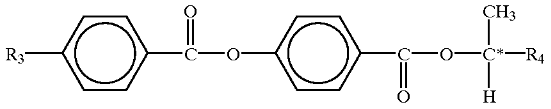

wherein $R_3$ is an alkyl group containing from 2 to 10 carbon atoms or an alkoxyl group containing from 2 to 10 carbon atoms, and wherein $R_4$ is an alkyl group containing from 2 to 10 carbon atoms;

compounds having the formula:

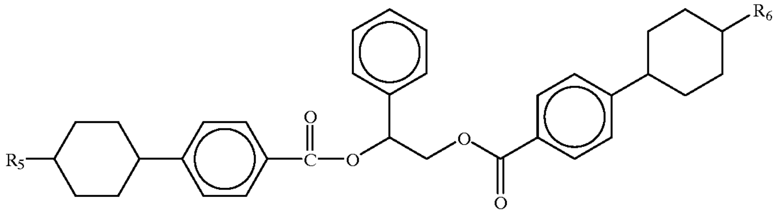

wherein $R_5$ is an alkyl group containing from 1 to 10 carbon atoms or an alkoxyl group containing from 1 to 10 carbon atoms, and wherein $R_6$ is an alkyl group containing from 1 to 10 carbon atoms or an alkoxyl group containing from 1 to 10 carbon atoms;

compounds having the formula:

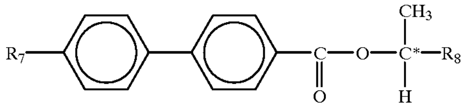

wherein $R_7$ is an alkyl group containing from 1 to 10 carbon atoms or an alkoxyl group containing from 1 to 10 carbon atoms, and wherein $R_8$ is an alkyl group containing from 2 to 10 carbon atoms; and compounds having the formula:

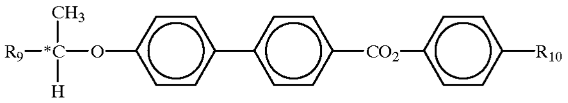

wherein $R_9$ is an alkyl group containing from 2 to 10 carbon atoms or an alkoxyl group containing from 2 to 10 carbon atoms, and wherein $R_{10}$ is an alkyl group containing from 1 to 10 carbon atoms.

23. A liquid crystal composition which exhibits a cholesteric phase at room temperature, and which exhibits bistability between a focal conic state and a planar state, said liquid crystal composition comprising:

a nematic liquid crystal material which contains a liquid crystal ester compound, said nematic liquid crystal material further comprising at least one kind of liquid crystal compound that is different in kind from said liquid crystal ester compound, said liquid crystal ester compound constituting at least 40 weight percent of said nematic liquid crystal material; and a chiral agent which contains an ester compound with no cholesterol rings, said liquid crystal composition containing said chiral agent at an amount sufficient to exhibit a cholesteric phase at room temperature;

wherein said chiral agent is at least one compound selected from the group consisting of compounds having the formula:

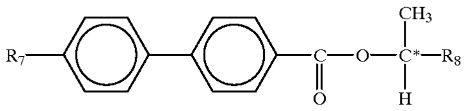

wherein $R_7$ is an alkyl group containing from 1 to 10 carbon atoms or an alkoxyl group containing from 1 to 10 carbon atoms, and wherein $R_8$ is an alkyl group containing from 2 to 10 carbon atoms, and compounds having the formula:

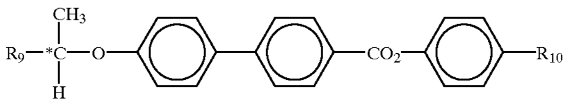

wherein $R_9$ is an alkyl group containing from 2 to 10 carbon atoms or an alkoxyl group containing from 2 to 10 carbon atoms, and wherein $R_{10}$ is an alkyl group containing from 1 to 10 carbon atoms.

24. A liquid crystal composition which exhibits a cholesteric phase at room temperature, and which exhibits bistabillty between a focal conic state and a planar state, said liquid crystal composition comprising:

a nematic liquid crystal material which contains a liquid crystal ester compound and which does not contain polymerizable liquid crystal material; and a chiral agent which contains an ester compound with no cholesterol rings, said liquid crystal composition containing said chiral agent at an amount sufficient to exhibit a cholesteric phase at room temperature.

25. A liquid crystal composition as claimed in claim 24, wherein said nematic liquid crystal material further comprises at least one kind of liquid crystal compound that is different in kind from said liquid crystal ester compound, said liquid crystal ester compound constituting at least 40 weight percent of said nematic liquid crystal material.

26. A liquid crystal composition which exhibits a cholesteric phase at room temperature, and which exhibits bistability between a focal conic state and a planar state, said liquid crystal composition comprising:

a nematic liquid crystal material which comprises a liquid crystal ester compound, a liquid crystal phenylcyclohexyl compound and a liquid crystal tolane compound, said liquid crystal ester compound constituting at least 40 weight percent and not more than 70 weight percent of the nematic liquid crystal material and represented by the following formula:

$$R_1\text{-1,4-(cyclohexane)}_a\text{—Ph—}CO_2\text{—Ph(X)—CN}$$

wherein $R_1$ is selected from the group consisting of a cyano group and an alkyl group expressed by $—C_nH_{2n+1}$ where n is an integer in the range of 2 to 10, wherein X is a halogen element or a hydrogen atom, Ph is a 1,4-phenylene wherein a is 0 or 1; and a chiral agent which contains an ester compound with no cholesterol rings, said liquid crystal composition containing said chiral agent at an amount sufficient to exhibit a cholesteric phase at room temperature;

wherein said chiral agent is at least one compound selected from the group consisting of compounds having the formula:

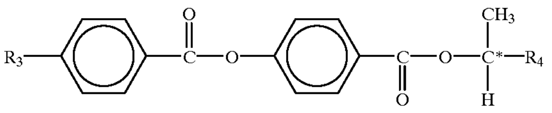

wherein $R_3$ is an alkyl group containing from 2 to 10 atoms or an alkoxyl group containing from 2 to 10 carbon atoms, and wherein $R_4$ is an alkyl group containing from 2 to 10 carbon atoms;

compounds having the formula:

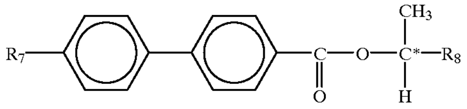

wherein $R_7$ is an alkyl group containing from 1 to 10 carbon atoms or an alkoxyl group containing from 1 to 10 carbon atoms, wherein $R_8$ is an alkyl group containing from 2 to 10 carbon atoms; and compounds having the formula:

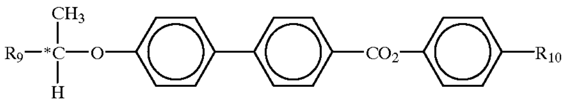

wherein $R_9$ is an alkyl group containing from 2 to 10 carbon atoms or an alkoxyl group containing from 2 to 10 carbon atoms, and wherein $R_{10}$ is an alkyl group containing from 1 to 10 carbon atoms.

27. A liquid crystal display comprising:

a pair of substrates, at least one of which is transparent;

a liquid crystal composition which is disposed between said pair of substrates and which exhibits a cholesteric phase at room temperature, said liquid crystal composition comprising:

a nematic liquid crystal material which contains a liquid crystal ester compound, said nematic liquid crystal material further comprising at least one kind of liquid crystal compound that is different in kind from said liquid crystal ester compound, said liquid crystal ester compound constituting at least 40 weight percent of said nematic liquid crystal material; and a chiral agent which contains an ester compound with no cholesterol rings, said liquid crystal composition containing said chiral agent at an amount sufficient to exhibit a cholesteric phase at room temperature, wherein said chiral agent is at least one compound selected from the group consisting of compounds having the formula:

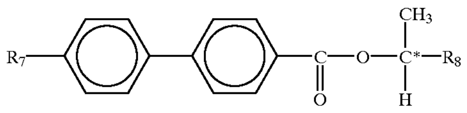

wherein $R_7$ is an alkyl group containing from 1 to 10 carbon atoms or an alkoxyl group containing from 1 to 10 carbon atoms, and wherein $R_8$ is an alkyl group containing from 2 to 10 carbon atoms; and compounds having the formula:

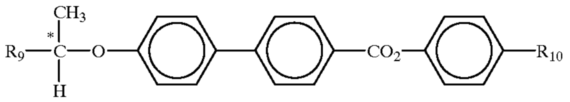

wherein $R_9$ is an alkyl group containing from 2 to 10 carbon atoms or an alkoxyl group containing from 2 to 10 carbon atoms, and wherein $R_{10}$ is an alkyl group containing from 1 to 10 carbon atoms; and wherein said liquid crystal composition exhibits bistability between a focal conic state and a planar state.

28. A liquid crystal display comprising:

a pair of substrates, at least one of which is transparent;

a liquid crystal composition which is disposed between said pair of substrates and which exhibits a cholesteric phase at room temperature, said liquid crystal composition comprising:

a nematic liquid crystal material which contains a liquid crystal ester; and a chiral agent which contains an ester compound with no cholesterol rings, said liquid crystal composition containing said chiral agent at an amount sufficient to exhibit a cholesteric phase at room temperature;

wherein said liquid crystal composition does not contain polymerizable liquid crystal material and exhibits bistability between a focal conic state and a planar state.

29. A liquid crystal display as claimed in claim 28, wherein said nematic liquid crystal material further comprises at least one liquid crystal compound that does not contain an ester, and wherein said liquid crystal ester compound constitutes at least 40 weight percent of said nematic liquid crystal material.

30. A liquid crystal display comprising:

a pair of substrates, at least one of which is transparent; and a liquid crystal composition which is disposed between said pair of substrates and which exhibits a cholesteric phase at room temperature, said liquid crystal composition comprising:

a nematic liquid crystal material which comprises a liquid crystal ester compound, a liquid crystal phenylcyclohexyl compound and a liquid crystal tolan compound, said liquid crystal ester compound constituting at least 40 weight percent and not more than 70 weight percent of the nematic liquid crystal material and represented by the following formula $R_1$-1,4-(cyclohexane)$_a$—Ph—$CO_2$—Ph(X)—CN wherein $R_1$ is selected from the group consisting of a cyano group and an alkyl group expressed by —$C_nH_{2n+1}$ where n is an integer in the range of 2 to 10, wherein X is a halogen element or a hydrogen atom, Ph is a 1,4-phenylene and wherein a is 0 or 1; and a chiral agent which contains an ester compound with no cholesterol rings, said liquid crystal composition containing said chiral agent at an amount sufficient to exhibit a cholesteric phase at room temperature;

wherein said chiral agent is at least one compound selected from the group consisting of compounds having the formula:

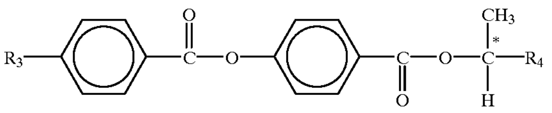

wherein $R_3$ is an alkyl group containing from 2 to 10 carbon atoms or an alkoxyl group containing from 2 to 10 carbon atoms, and wherein $R_4$ is an alkyl group containing from 2 to 10 carbon atoms;

compounds having the formula:

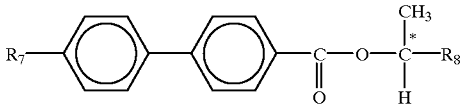

wherein $R_7$ is an alkyl group containing from 1 to 10 carbon atoms or an alkoxyl group containing from 1 to 10 carbon atoms, and wherein $R_8$ is an alkyl group containing from 2 to 10 carbon atoms; and compounds having the formula:

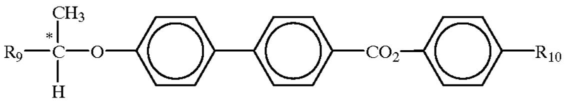

wherein $R_9$ is an alkyl group containing from 2 to 10 carbon atoms or an alkoxyl group containing from 2 to 10 carbon atoms, and wherein $R_{10}$ is an alkyl group containing from 1 to 10 carbon atoms;

wherein said liquid crystal composition exhibits bistability between a focal conic state and a planar state.

31. A liquid crystal composition which exhibits a cholesteric phase at room temperature, and which exhibits bistability between a focal conic state and a planar state, said liquid crystal composition comprising:

a nematic liquid crystal material which comprises a liquid crystal ester compound, a liquid crystal phenylcyclohexyl compound and a liquid crystal tolan compound; and a chiral agent which contains an ester compound with no cholesterol rings, said liquid crystal composition containing said chiral agent in an amount sufficient to exhibit a cholesteric phase at room temperature.

32. A liquid crystal composition in accordance with claim 31, wherein said liquid crystal ester compound is represented by the following formula:

$$R_1\text{-1,4-(cyclohexane)}_a\text{—Ph—}CO_2\text{—Ph(X)—CN}$$

wherein $R_1$ is selected from the group consisting of a cyano group and an alkyl group expressed by $—C_nH_{2n+1}$ where n is an integer in the range of 2 to 10, wherein X is a halogen element or a hydrogen atom, Ph is a 1,4-phenylene, and wherein a is 0 or 1.

33. A liquid crystal composition in accordance with claim 28, wherein said liquid crystal ester compound constitutes at least 40 weight percent of said nematic liquid crystal material.

34. A liquid crystal display comprising:

a pair of substrates, at least one of which is transparent; and a liquid crystal composition which is disposed between said pair of substrates and which exhibits a cholesteric phase at room temperature, said liquid crystal composition comprising:

a nematic liquid crystal material which comprises a liquid crystal ester compound, a liquid crystal phenylcyclohexyl compound and a liquid crystal tolane compound; and a chiral agent which contains an ester compound with no cholesterol rings, said liquid crystal composition containing said chiral agent in an amount sufficient to exhibit a cholesteric phase at room temperature;

wherein said liquid crystal composition exhibits bistability between a focal conic state and planar state.

35. A liquid crystal display in accordance with claim 30, wherein said liquid crystal ester compound constitutes at least 40 weight percent of said nematic liquid crystal material.

* * * * *